United States Patent
Brant et al.

(10) Patent No.: US 8,008,412 B2
(45) Date of Patent: Aug. 30, 2011

(54) POLYMER PRODUCTION AT SUPERSOLUTION CONDITIONS

(75) Inventors: Patrick Brant, Seabrook, TX (US); Kiss Gabor, Hampton, NJ (US); Chris B. Friedersdorf, Kingwood, TX (US); James R. Lattner, Laporte, TX (US); Gary L. Casty, Easton, PA (US)

(73) Assignee: ExxonMobil Chemical Patents Inc., Houston, TX (US)

(*) Notice: Subject to any disclaimer, the term of this patent is extended or adjusted under 35 U.S.C. 154(b) by 755 days.

(21) Appl. No.: 11/954,273

(22) Filed: Dec. 12, 2007

(65) Prior Publication Data
US 2008/0090974 A1 Apr. 17, 2008

Related U.S. Application Data

(63) Continuation-in-part of application No. 10/667,585, filed on Sep. 22, 2003, now Pat. No. 7,354,979, and a continuation-in-part of application No. 11/714,546, filed on Mar. 6, 2007.

(60) Provisional application No. 60/933,007, filed on Jun. 4, 2007, provisional application No. 60/412,541, filed on Sep. 20, 2002.

(51) Int. Cl.
*C08F 10/06* (2006.01)
*C08F 2/06* (2006.01)
*C08F 4/60* (2006.01)
*C08F 4/64* (2006.01)

(52) U.S. Cl. ............. 526/64; 526/67; 526/68; 526/160; 526/161; 526/172; 526/206; 526/348; 526/351

(58) Field of Classification Search .................. 526/64, 526/67, 68, 160, 161, 172, 206, 348, 351
See application file for complete search history.

(56) References Cited

U.S. PATENT DOCUMENTS

| | | |
|---|---|---|
| 2,153,553 A | 4/1939 | Fawcett et al. |
| 2,852,501 A | 9/1958 | Richard, Jr. et al. |
| 3,056,771 A | 10/1962 | Aldridge et al. |
| 3,294,772 A | 12/1966 | Cottle |
| 3,470,143 A | 9/1969 | Schrage et al. |
| 3,678,088 A | 7/1972 | Hedberg et al. |
| 3,725,378 A | 4/1973 | Chamberlin |
| 4,135,044 A | 1/1979 | Beals |
| 4,153,774 A | 5/1979 | Boettcher et al. |
| 4,337,142 A | 6/1982 | Knudson et al. |
| 4,530,914 A | 7/1985 | Ewen et al. |
| 4,588,790 A | 5/1986 | Jenkins, III et al. |
| 4,740,550 A | 4/1988 | Foster |
| 4,769,510 A | 9/1988 | Kaminsky et al. |
| 4,794,004 A | 12/1988 | Pfleger et al. |
| 4,794,096 A | 12/1988 | Ewen |
| 4,962,262 A | 10/1990 | Winter et al. |
| 5,026,798 A | 6/1991 | Canich |
| 5,081,322 A | 1/1992 | Winter et al. |
| 5,084,534 A | 1/1992 | Welborn, Jr. et al. |
| 5,096,867 A | 3/1992 | Canich |
| 5,236,998 A | 8/1993 | Lundeen et al. |
| 5,272,236 A | 12/1993 | Lai et al. |
| 5,324,799 A | 6/1994 | Yano et al. |
| 5,324,800 A | 6/1994 | Welborn, Jr. et al. |
| 5,326,835 A | 7/1994 | Ahvenainen et al. |
| 5,328,969 A | 7/1994 | Winter et al. |
| 5,332,706 A | 7/1994 | Nowlin et al. |
| 5,352,749 A | 10/1994 | DeChellis et al. |
| 5,382,630 A | 1/1995 | Stehling et al. |
| 5,382,631 A | 1/1995 | Stehling et al. |
| 5,391,654 A | 2/1995 | Ahvenainen et al. |
| 5,405,922 A | 4/1995 | DeChellis et al. |
| 5,408,017 A | 4/1995 | Turner et al. |

(Continued)

FOREIGN PATENT DOCUMENTS

CA 2118711 3/1993

(Continued)

OTHER PUBLICATIONS

N. Suzuki et al., Olefin Polymerization Using Highly Congested *ansa*-Metallocenes under High Pressure: Formation of Superhigh Molecular Weight Polyolefins, Macromolecules, 2000, vol. 33, pp. 754-759.

Schaverien et al., Ethylene Bis(2-Indenyl) Zirconocene: A New Class of Diastereomeric Metallocenes for the (Co) Polymerization of Alpha-Olefins, Organometallics, vol. 20, No. 16, 2001, p. 3436-3452.

Lahelin et al., Propylene Polymerization with $rac$-SiMe$_2$(2-ME-4-PhInd)$_2$ZrMe$_2$/MAO: Polymer Characterization and Kinetic Models, Macromol. Chem. Phys., 2003, v. 204, pp. 1323-1337.

U.S. Appl. No. 12/074,496, filed Mar. 4, 2008, Gabor Kiss et al.
U.S. Appl. No. 60/933,007, filed Jun. 4, 2007, Brant et al.
U.S. Appl. No. 60/937,929, filed Jun. 29, 2007, Kiss et al.

(Continued)

*Primary Examiner* — Roberto Rabago
(74) *Attorney, Agent, or Firm* — Catherine L. Bell; Renuka N. Ganesh

(57) ABSTRACT

This invention relates to a process to polymerize olefins comprising contacting propylene, at a temperature of 65° C. to 150° C. and a pressure of 1.72 to 34.5 MPa, with: 1) a catalyst system comprising one or more activators and one or more nonmetallocene metal-centered, heteroaryl ligand catalyst compounds, where the metal is chosen from the Group 4, 5, 6, the lanthanide series, or the actinide series of the Periodic Table of the Elements, 2) optionally one or more comonomers selected from ethylene and C4 to C12 olefins, 3) diluent or solvent, and 4) optionally scavenger, wherein: a) the olefin monomers and any comonomers are present in the polymerization system at 30 wt % or more, b) the propylene is present in the feed at 80 wt % or more, c) the polymerization occurs at a temperature above the solid-fluid phase transition temperature of the polymerization system and a pressure greater than 1 MPa below the cloud point pressure of the polymerization system, and d) the polymerization occurs: (1) at a temperature below the critical temperature of the polymerization system, or (preferably and) (2) at a pressure below the critical pressure of the polymerization system.

25 Claims, No Drawings

Page 2

U.S. PATENT DOCUMENTS

| | | |
|---|---|---|
| 5,416,153 A | 5/1995 | Winter et al. |
| 5,434,116 A | 7/1995 | Sone et al. |
| 5,455,365 A | 10/1995 | Winter et al. |
| 5,466,766 A | 11/1995 | Patsidis et al. |
| 5,468,810 A | 11/1995 | Hayakawa et al. |
| 5,489,659 A | 2/1996 | Sugano et al. |
| 5,504,171 A | 4/1996 | Etherton et al. |
| 5,504,232 A | 4/1996 | Winter et al. |
| 5,514,761 A | 5/1996 | Etherton et al. |
| 5,585,509 A | 12/1996 | Langhauser et al. |
| 5,652,308 A | 7/1997 | Merrill et al. |
| 5,670,595 A | 9/1997 | Meka et al. |
| 5,672,668 A | 9/1997 | Winter et al. |
| 5,693,730 A | 12/1997 | Kuber et al. |
| 5,693,836 A | 12/1997 | Winter et al. |
| 5,710,223 A | 1/1998 | Fukuoka et al. |
| 5,723,560 A | 3/1998 | Canich |
| 5,723,705 A | 3/1998 | Herrmann et al. |
| 5,756,608 A | 5/1998 | Langhauser et al. |
| 5,763,542 A | 6/1998 | Winter et al. |
| 5,780,565 A | 7/1998 | Clough et al. |
| 5,840,644 A | 11/1998 | Kuber et al. |
| 5,866,663 A | 2/1999 | Brookhart et al. |
| 5,882,750 A | 3/1999 | Mink et al. |
| 5,936,053 A | 8/1999 | Fukuoka et al. |
| 5,962,719 A | 10/1999 | Winter et al. |
| 5,965,674 A | 10/1999 | Moen et al. |
| 5,969,062 A | 10/1999 | Moll et al. |
| 5,998,547 A | 12/1999 | Hohner |
| 6,028,152 A | 2/2000 | Winter et al. |
| 6,034,022 A | 3/2000 | McAdon et al. |
| 6,051,522 A | 4/2000 | Rohrmann et al. |
| 6,057,408 A | 5/2000 | Winter et al. |
| 6,084,041 A | 7/2000 | Andtsjo et al. |
| 6,084,115 A | 7/2000 | Chen et al. |
| 6,087,292 A | 7/2000 | Winter et al. |
| 6,124,231 A | 9/2000 | Fritze et al. |
| 6,143,682 A | 11/2000 | Fisher |
| 6,143,686 A | 11/2000 | Vizzini et al. |
| 6,153,776 A | 11/2000 | Patton et al. |
| 6,160,072 A | 12/2000 | Ewen |
| 6,169,051 B1 | 1/2001 | Mitani et al. |
| 6,197,910 B1 | 3/2001 | Weng et al. |
| 6,207,756 B1 | 3/2001 | Datta et al. |
| 6,218,488 B1 | 4/2001 | Schiffino et al. |
| 6,225,432 B1 | 5/2001 | Weng et al. |
| 6,228,795 B1 | 5/2001 | Vizzini |
| 6,255,410 B1 | 7/2001 | Shigekauzu et al. |
| 6,268,444 B1 | 7/2001 | Klosin et al. |
| 6,291,699 B1 | 9/2001 | Birmingham et al. |
| 6,300,451 B1 | 10/2001 | Mehta et al. |
| 6,326,493 B1 | 12/2001 | Mitani et al. |
| 6,355,741 B1 | 3/2002 | Marechal |
| 6,359,095 B1 | 3/2002 | Winter et al. |
| 6,362,356 B1 | 3/2002 | Repo et al. |
| 6,372,847 B1 | 4/2002 | Wouters |
| 6,399,723 B1 | 6/2002 | Burkhardt et al. |
| 6,451,938 B1 | 9/2002 | Fisher et al. |
| 6,458,982 B1 | 10/2002 | Schottek et al. |
| 6,465,700 B1 | 10/2002 | Sullivan et al. |
| 6,469,188 B1 | 10/2002 | Miller et al. |
| 6,479,424 B1 | 11/2002 | Ernst et al. |
| 6,479,646 B1 | 11/2002 | Nakano et al. |
| 6,482,902 B1 | 11/2002 | Bohnen et al. |
| 6,492,473 B1 | 12/2002 | Canich et al. |
| 6,492,539 B1 | 12/2002 | Bingel et al. |
| 6,521,727 B2 | 2/2003 | Eilerts et al. |
| 6,525,157 B2 | 2/2003 | Cozewith et al. |
| 6,562,914 B1 | 5/2003 | Andtsjo et al. |
| 6,562,920 B2 | 5/2003 | Brant |
| 6,576,306 B2 | 6/2003 | Mehta et al. |
| 6,583,277 B2 | 6/2003 | Luo et al. |
| 6,620,896 B1 | 9/2003 | Killian et al. |
| 6,635,779 B1 | 10/2003 | Ewen et al. |
| 6,642,316 B1 | 11/2003 | Datta et al. |
| 6,689,847 B2 | 2/2004 | Mawson et al. |
| 6,737,487 B2 | 5/2004 | Meverden |
| 6,770,714 B2 | 8/2004 | Ommundsen et al. |
| 6,881,800 B2 | 4/2005 | Friedersdorf |
| 6,969,490 B2 | 11/2005 | Marx et al. |
| 7,022,780 B2 | 4/2006 | Marx et al. |
| RE39,156 E | 7/2006 | Winter et al. |
| 7,087,690 B2 | 8/2006 | Boussie et al. |
| 7,163,989 B2 | 1/2007 | Friedersdorf |
| 7,214,746 B2 | 5/2007 | Voskoboynikov et al. |
| 7,214,747 B2 | 5/2007 | Voskoboynikov et al. |
| 7,265,193 B2 | 9/2007 | Weng et al. |
| 7,276,567 B2 | 10/2007 | Voskoboynikov et al. |
| 7,279,536 B2 | 10/2007 | Brant et al. |
| 7,319,125 B2 | 1/2008 | Arjunan et al. |
| 7,351,779 B2 | 4/2008 | Iaccino et al. |
| 7,354,979 B2 | 4/2008 | Brant et al. |
| 7,429,634 B2 | 9/2008 | Brant et al. |
| 7,446,216 B2 | 11/2008 | Voskoboynikov et al. |
| 7,538,168 B2 | 5/2009 | Voskoboynikov et al. |
| 7,550,544 B2 | 6/2009 | Voskoboynikov et al. |
| 7,557,171 B2 | 7/2009 | Voskoboynikov et al. |
| 7,667,064 B2 | 2/2010 | Voskoboynikov et al. |
| 7,709,670 B2 | 5/2010 | Voskoboynikov et al. |
| 2001/0031834 A1 | 10/2001 | Ushioda et al. |
| 2001/0044505 A1 | 11/2001 | Ford et al. |
| 2001/0044506 A1 | 11/2001 | Mehta et al. |
| 2001/0053833 A1 | 12/2001 | Nakano et al. |
| 2002/0002261 A1 | 1/2002 | Yahata et al. |
| 2002/0004575 A1 | 1/2002 | Cozewith et al. |
| 2002/0013440 A1 | 1/2002 | Agarwal et al. |
| 2002/0016415 A1 | 2/2002 | Laughner et al. |
| 2002/0065379 A1 | 5/2002 | Murray |
| 2002/0096797 A1 | 7/2002 | Stoffelsma et al. |
| 2002/0156279 A1* | 10/2002 | Boussie et al. ............ 546/13 |
| 2002/0193535 A1 | 12/2002 | Meverden et al. |
| 2003/0032549 A1 | 2/2003 | Vogel |
| 2003/0088021 A1 | 5/2003 | Van Dun et al. |
| 2003/0194575 A1* | 10/2003 | Tau et al. ............... 428/515 |
| 2004/0024146 A1* | 2/2004 | Friedersdorf ............. 526/82 |
| 2004/0024148 A1 | 2/2004 | Meverden |
| 2004/0122191 A1 | 6/2004 | Arjunan et al. |
| 2004/0127654 A1 | 7/2004 | Brant et al. |
| 2004/0132935 A1 | 7/2004 | Arjunan et al. |
| 2004/0152882 A1 | 8/2004 | Ekhom et al. |
| 2004/0158010 A1 | 8/2004 | Lehmus et al. |
| 2004/0158015 A1 | 8/2004 | Senninger |
| 2004/0242734 A1 | 12/2004 | Lakeman et al. |
| 2004/0260107 A1 | 12/2004 | Oberhoff et al. |
| 2005/0042294 A1 | 2/2005 | Thanoo et al. |
| 2005/0090384 A1 | 4/2005 | Wang et al. |
| 2006/0009595 A1 | 1/2006 | Rix et al. |
| 2006/0025545 A1 | 2/2006 | Brant et al. |
| 2006/0096175 A1 | 5/2006 | Russell et al. |
| 2006/0134221 A1 | 6/2006 | Geall |
| 2006/0167195 A1 | 7/2006 | Resconi et al. |
| 2006/0183861 A1 | 8/2006 | Harrington et al. |
| 2006/0183881 A1 | 8/2006 | Ibar |
| 2006/0211832 A1 | 9/2006 | Brant et al. |
| 2006/0293474 A1 | 12/2006 | Brant et al. |
| 2007/0135596 A1 | 6/2007 | Voskoboynikov et al. |
| 2007/0135597 A1 | 6/2007 | Voskoboynikov et al. |
| 2007/0135623 A1 | 6/2007 | Voskoboynikov et al. |
| 2007/0255018 A1 | 11/2007 | Brant |
| 2008/0090974 A1 | 4/2008 | Brant et al. |
| 2008/0153996 A1 | 6/2008 | Friedersdorf et al. |
| 2008/0153997 A1 | 6/2008 | Casty et al. |
| 2008/0188635 A1 | 8/2008 | Brant et al. |
| 2008/0211832 A1 | 9/2008 | Kumon |
| 2008/0214767 A1 | 9/2008 | Mehta et al. |
| 2008/0234443 A1 | 9/2008 | Kiss et al. |
| 2009/0076214 A1 | 3/2009 | Kiss et al. |
| 2009/0076216 A1 | 3/2009 | Kiss et al. |
| 2009/0163642 A1 | 6/2009 | Kiss et al. |
| 2009/0163643 A1 | 6/2009 | Kiss et al. |
| 2009/0163678 A1 | 6/2009 | Kiss et al. |
| 2009/0186995 A1 | 7/2009 | Canich et al. |
| 2009/0292085 A1 | 11/2009 | Kiss et al. |
| 2010/0063338 A1 | 3/2010 | Kiss et al. |

FOREIGN PATENT DOCUMENTS

| | | |
|---|---|---|
| CA | 2103694 | 2/1994 |
| DE | 300291 | 3/1988 |
| DE | 4426569 | 7/1994 |
| DE | 19823168 | 5/1998 |
| EP | 0 089 691 | 9/1983 |
| EP | 0 129 368 | 12/1984 |
| EP | 129 368 | 12/1984 |
| EP | 0 416 815 | 3/1991 |
| EP | 0 480 190 | 4/1992 |
| EP | 0 459 320 | 11/1992 |
| EP | 0 517 183 | 12/1992 |
| EP | 0 530 908 | 3/1993 |
| EP | 0 552 945 | 7/1993 |
| EP | 0 577 581 | 1/1994 |
| EP | 0 582 195 | 2/1994 |
| EP | 0 584 609 | 3/1994 |
| EP | 0 603 232 | 6/1994 |
| EP | 0 628 566 | 12/1994 |
| EP | 0 645 401 | 3/1995 |
| EP | 0 666 267 | 8/1995 |
| EP | 0 667 359 | 8/1995 |
| EP | 0 670 325 | 9/1995 |
| EP | 0 693 502 | 1/1996 |
| EP | 0 714 923 | 6/1996 |
| EP | 0 718 324 | 6/1996 |
| EP | 0 742 227 | 11/1996 |
| EP | 0 806 436 | 11/1997 |
| EP | 0 846 696 | 6/1998 |
| EP | 0 882 078 | 12/1998 |
| EP | 0 882 731 | 12/1998 |
| EP | 0 887 379 | 12/1998 |
| EP | 0 887 380 | 12/1998 |
| EP | 0 942 017 | 9/1999 |
| EP | 0 957 113 | 11/1999 |
| EP | 0 987 279 | 3/2000 |
| EP | 1 123 226 | 5/2000 |
| EP | 1 008 607 | 6/2000 |
| EP | 1 033 371 | 9/2000 |
| EP | 1 138 687 | 10/2001 |
| EP | 1 193 275 | 4/2002 |
| EP | 1 195 391 | 4/2002 |
| EP | 1 231 226 | 8/2002 |
| EP | 1 323 746 | 7/2003 |
| GB | 1 443 394 | 7/1976 |
| JP | 06-025357 | 2/1994 |
| JP | 07-216011 | 8/1995 |
| JP | 08-127612 | 5/1996 |
| JP | 3323347 | 7/1996 |
| JP | 08-208535 | 8/1996 |
| JP | 96-208535 | 8/1996 |
| JP | 08-301914 | 11/1996 |
| JP | 09-216916 | 8/1997 |
| JP | 10-045834 | 2/1998 |
| JP | 10-110003 | 4/1998 |
| JP | 98-110003 | 4/1998 |
| JP | 98-341202 | 4/1998 |
| JP | 3421202 | 4/1998 |
| JP | 11-001508 | 1/1999 |
| JP | 11-060588 | 3/1999 |
| JP | 11-080183 | 3/1999 |
| JP | 11-171925 | 6/1999 |
| PL | 281277 | 3/1991 |
| WO | WO 88/02376 | 4/1988 |
| WO | WO 88/04672 | 6/1988 |
| WO | WO 91/04257 | 4/1991 |
| WO | WO 92/14766 | 9/1992 |
| WO | WO 93/05082 | 3/1993 |
| WO | WO 93/11171 | 6/1993 |
| WO | WO 94/00500 | 1/1994 |
| WO | WO 95/04087 | 2/1995 |
| WO | WO 95/25757 | 9/1995 |
| WO | WO 96/00246 | 1/1996 |
| WO | WO 96/04317 | 2/1996 |
| WO | WO 96/12744 | 5/1996 |
| WO | WO 96/18662 | 6/1996 |
| WO | WO 96/33227 | 10/1996 |
| WO | WO 96/34023 | 10/1996 |
| WO | WO 96/38458 | 12/1996 |
| WO | WO 97/03124 | 1/1997 |
| WO | WO 97/11098 | 3/1997 |
| WO | WO 97/13790 | 4/1997 |
| WO | WO 97/44391 | 11/1997 |
| WO | WO 97/45434 | 12/1997 |
| WO | WO 97/48737 | 12/1997 |
| WO | WO 98/13393 | 4/1998 |
| WO | WO 98/33823 | 8/1998 |
| WO | WO 98/49229 | 11/1998 |
| WO | WO 99/11680 | 3/1999 |
| WO | WO 99/26985 | 6/1999 |
| WO | WO 99/29749 | 6/1999 |
| WO | WO 99/40129 | 8/1999 |
| WO | WO 99/41289 | 8/1999 |
| WO | WO 99/42467 | 8/1999 |
| WO | WO 99/43717 | 9/1999 |
| WO | WO 99/61488 | 12/1999 |
| WO | WO 00/06621 | 2/2000 |
| WO | WO 00/12565 | 3/2000 |
| WO | WO 00/12572 | 3/2000 |
| WO | WO 00/25916 | 5/2000 |
| WO | WO 00/26266 | 5/2000 |
| WO | WO 00/37514 | 6/2000 |
| WO | WO 00/40625 | 7/2000 |
| WO | WO 00/43406 | 7/2000 |
| WO | WO 00/50475 | 8/2000 |
| WO | WO 00/64952 | 11/2000 |
| WO | WO 00/69871 | 11/2000 |
| WO | WO 01/44318 | 6/2001 |
| WO | WO 01/46273 | 6/2001 |
| WO | WO 01/57095 | 8/2001 |
| WO | WO 02/00744 | 1/2002 |
| WO | WO 02/34795 | 5/2002 |
| WO | WO 02/34795 A1 * | 5/2002 |
| WO | WO 02/38628 | 5/2002 |
| WO | WO 02/44260 | 6/2002 |
| WO | WO 02/50145 | 6/2002 |
| WO | WO 02/070572 | 9/2002 |
| WO | WO 02/083753 | 10/2002 |
| WO | WO 02/090399 | 11/2002 |
| WO | WO 02/098930 | 12/2002 |
| WO | WO 03/040095 | 5/2003 |
| WO | WO 03/040195 | 5/2003 |
| WO | WO 03/040201 | 5/2003 |
| WO | WO 03/040202 | 5/2003 |
| WO | WO 03/040233 | 5/2003 |
| WO | WO 03/040442 | 5/2003 |
| WO | WO 2004/013194 | 2/2004 |
| WO | WO 2004/024740 | 3/2004 |
| WO | WO 2004/026921 | 4/2004 |
| WO | WO 2004/026923 | 4/2004 |
| WO | WO 2004/026925 | 4/2004 |
| WO | WO 2004/033510 | 4/2004 |
| WO | WO 2004/050724 | 6/2004 |
| WO | WO 2004/052950 | 6/2004 |
| WO | WO 2004/060941 | 7/2004 |
| WO | WO 2005/113610 | 12/2005 |
| WO | WO 2005/113615 | 12/2005 |
| WO | WO 2006/002132 | 1/2006 |
| WO | WO 2006/009942 | 1/2006 |
| WO | WO 2006/009944 | 1/2006 |
| WO | WO 2006/009945 | 1/2006 |
| WO | WO 2006/009946 | 1/2006 |
| WO | WO 2006/009949 | 1/2006 |
| WO | WO 2006/009951 | 1/2006 |
| WO | WO 2006/009976 | 1/2006 |
| WO | WO 2006/009977 | 1/2006 |
| WO | WO 2006/009979 | 1/2006 |
| WO | WO 2006/009980 | 1/2006 |
| WO | WO 2006/009981 | 1/2006 |
| WO | WO 2006/019494 | 2/2006 |
| WO | WO 2006/025917 | 3/2006 |
| WO | WO 2006/025949 | 3/2006 |
| WO | WO 2006/028549 | 3/2006 |
| WO | WO 2006/044149 | 4/2006 |
| WO | WO 2006/083303 | 8/2006 |
| WO | WO 2006/097497 | 9/2006 |
| WO | WO 2006/097500 | 9/2006 |
| WO | WO 2006/120177 | 11/2006 |

| WO | WO 2006/130046 | 12/2006 |
| WO | WO 2006/134046 | 12/2006 |
| WO | WO 2007/037944 | 4/2007 |
| WO | WO 2007/107448 | 9/2007 |
| WO | WO 2007/116034 | 10/2007 |
| WO | WO 2009/082468 | 7/2009 |

OTHER PUBLICATIONS

U.S. Appl. No. 61/004,336, filed Nov. 27, 2007, Deffenbaugh et al.
Author Unknown, Operation of the Reactor with a Sealed Electric Motor in Manufacture of Ditolyethane.
Author Unknown, "Propylene Supercritical Polymerization Tests in Yangzi Make Breakthrough" China Chemical Reporter, vol. 15, Apr. 6, 2005.
Alt et al., Effect of the Nature of Metallocene Complexes of Group IV Metals on Their Performance in Catalytic Ethylene and Propylene Polymerization, Chem. Rev. 100, 2000, pp. 1205-1221.
Alt et al., Syndiospecific Polymerization of Propylene: Synthesis of $CH_2$- and CHR-Bridged Fluorenyl-Containing Ligand Precursors for Metallocene Complexes of Type $(C_{13}H_{8-n},R'_nCHR-C_5H_4)ZrCl_2$ (n = 0, 2; R = H, Alkyl; R' = H, Hal), Journal of Organometallic Chemistry, 1996, vol. 526, No. 2, pp. 295-301.
Alt et al., Syndiospezifische Polymerisation von Propylen: 2- und 2,7—substituierte Metallocenkomplex des typs $(C_{13}H_{8-n}R_nCR'_2C_5H_4) MCl_2$(n = 1,2; R = Alkoxy, Alkyl, Aryl, Hal; R' = Me, Ph; M= Zr, Hf)[1], Journal of Organometallic Chemistry, 1996, vol. 522, No. 1, pp. 39-54.
Akimoto et al., New Developments in the Production of Metallocene LLDPE by High pressure Polymerization, Tosoh Corp., Metallocene-Based Polyolefins 2000 (conference proceedings), pp. 287-308 (John Wiley & Sons Ltd.).
Bandy et al., Polymerisation of Ethylene and Propene Using New chiral Zirconium Derivatives, Crystal Structure of $[ZrL^1Cl_2][H_2L^1=(4S,5S)$-trans-4,5-bis(1H-inden-1-ylmethyl)-2,2-dimethyl-1,3-dioxoland], J. Chem. Soc., Dalton Trans., 1991, pp. 2207-2216.
Barnhart et al., Synthesis of Branched Polyolefins Using a Combination of Homogeneous Metallocene Mimics, J. Am. Chem. Soc., 1998, vol. 120, pp. 1082-1083.
Bergemann et al., Copolymerization of Ethylene and Linear α-Olefins with a Metallocene Catalyst System under High Pressure, Part II. Comparison of Propene, 1-Butene, 1-Hexene, and 1-Decene, J. Mol. Catal. A: Chemical 105, 1996, pp. 87-91.
Bergemann et al., Copolymerization of Ethylene and 1,5-Hexadiene Under High Pressure Catalyzed by a Metallocene, Journal of Molecular Catalysis A: Chemical, 116, 1997, pp. 317-322.
Bergemann et al., Journal of Molecular Catalysis A: Chemical 102, 1995, pp. 1-5.
Britovsek et al., The Search for New-Generation Olefin Polymerization Catalysts: Life Beyond Metallocenes, Chemie Intl. Edn., 1999, vol. 38, pp. 428-447.
Bujadoux, Use of Bridged and Non-Bridged Metallocene Catalysts in High Pressure/High Temperature Ethylene/α-Olefin Copolymerization, Metallocenes 95 Intl. Congr., Metallocene Polym., 1995, pp. 375-402, Scotland Bus. Rsrch. Publ.
Chen et al., Cocatalysts for Metal-Catalyzed Olefin Polymerization: Activators, Activation Processes, and Structure-Activity Relationships, Chem. Rev., 2000, vol. 100, pp. 1391-1434.
Coates, et al., Oscillating Stereocontrol: A Strategy for the Synthesis of Thermoplastic Elastomeric Polypropylene, Science, 1995, vol. 267, pp. 217-219.
Coates, Precise Control of Polyolefin Stereochemistry Using Single Site Metal Catalysts, Chem. Rev. 100, 2000, pp. 1223-1252.
Conway et al., Formation and Reactivity of Halogen Derivatives of (η5-Cyclopentadienyl)thallium, Organometallics, 1985, vol. 4, pp. 688-693.
Cottom, Waxes, in Encyclo. Chem. Tech., vol. 25, pp. 614-626, 4th Ed.
Dassaud et al., Copolymerization of Propene-Nonconjugated Dienes: Derivatization Through Hydroboration and Epoxydation, Polym. Adv. Technol., 4(7), 1993, pp. 457-464.

Dreier, et al., 2-Hetaryl-Substituted Bis(indenyl)zirconium Complexes as Catalyst Precursors for Elastomeric Polypropylene Formation, Organometallics, 2000, vol. 19, pp. 4095-4103.
Dreier, et al., Group 4 Metallocenes Containing Hetaryl Substituents at Their η-ligands: Synthesis and Characterization of the Parent bis[2-(2-furyl)indenyl]zirconocene system, J. Organometallic Chem., 2001, vol. 622, pp. 143-148.
Dreier, et al., Conformational features of a furyl-substituted bis(tetrahydroindynyl)zirconium dichloride system, J. Phys. Org. Chem., 2002, vol. 15, pp. 582-589.
Dreier et al., Structural and Dynamic Features of Bis[2-(2-furyl)indenyl]zirconium Derivatives, Organometallics, 2001, vol. 20, pp. 5067-5075.
Eckstein et al., Determination of Plateau Moduli and Entanglement Molecular Weights of Isotactic, Syndiotactic, and Atactic Polypropylenes Synthesized with Metallocene Catalysts, Macromolecules, 31, 1998, pp. 1335-1340.
Erker et al., Hydroboration of Bis(alkenylcyclopentadienyl)zirconium Dichlorides[1]), Chemische Berichte, 1991, vol. 124, pp. 1301-1310.
Erker et al., Cp-Substituent Additivity Effects controlling the Stereochemistry of the Propene Polymerization Reaction at Conformationally Unrestricted $(Cp-CHR^1R^2)_2ZrCl_2$/Methylalumoxane Catalysts, J. Am. Chem. Soc., 1991, vol. 113, pp. 7594-7602.
Erker et al., Synthesis of ansa-Metallocenes by Intramolecular Photochemical [2+2] Cycloaddition of Bis(alkenylcyclopentadienyl)zirconium Complexes, Organometallics, 1993, vol. 12, pp. 2140-2151.
Ewen et al., Syndiospecific Propylene Polymerizations with Group 4 Metallocenese, J. Am. Chem. Soc., 1988, vol. 110, pp. 6255-6256.
Finch et al., Substituent Effects on the cleavage Rates of Titanocene Metallacyclobutanes, Journal of the American Chemical Society, Washington, DC, US, 1998, vol. 110, pp. 2406-2413.
Gotz et al., MAO-Free Metallocene Based Catalysts in High Pressure Polymerization of Ethylene and 1-Hexene, Chem. Eng. Technol., 21, 1998, pp. 954-957 (Wiley-VCH Verlag GmbH).
Hackmann et al., functional Olefin Copolymers: Uniform Architectures of Propene/7-Methyl-1,6-Octadiene Copolymers by ATR-FTIR Spectroscopy Control of Monomer Composition, Macromolecules, American Chemical Society, Easton, US, vol. 33, No. 5, Mar. 7, 2000, pp. 1524-1529 (German).
Hackmann et al., Zirconocene-MAO Catalyzed Homo- and Copolymerizations of Linear Assymetrically Substituted Dienes with Propene: A Novel Strategy of Functional (co)poly(α-olefin)s, Macromol. Chem. Phys., 1998, pp. 1511-1517 (German).
Han et al., Permercuration of Ferrocenes and Ruthenocenes. New Approaches to Complexes Bearing Perhalogenated Cyclopentadienyl Ligands, Organometallics, 1994, vol. 13, No. 8, pp. 3009-3019.
Hassan et al., Aryl-Aryl Bond Formation One Century after the Discovery of the Ullmann Reaction, Chem. Rev., 2002, vol. 102, pp. 1359-1469.
Hauptman, et al., Stereoblock Polypropylene: Ligand Effects on the Stereospecificity of 2-Arylindene Zirconocene Catalysts, J. Am. Chem. Soc., 1995, vol. 117, pp. 11586-11587.
Hollis et al., Preparation and Properties of (S,S)-[Ti((R,R)-cyclacene)C12], a Chiral Strapped Bent Metallocene, Organometallics, 1992, vol. 11, pp. 2812-2816.
Ittel, et al., Late metal Catalysts for Ethylene Homo- and Copolymerization, Chem. Rev. 2000, vol. 100, pp. 1169-1203.
Janiak, Metallocene Catalysts for Olefin Polymerization, Metallocenes: Synthesis, Reactivity, and Applications, vol. 2, Wiley-VCH, 1998, pp. 547-614, A. Togni and R. L. Halterman, editors.
Johnston et al., Investigation of the Electrochemical Properties of Substituted Titanocene Dichlorides, Electrochemica Acta, 1995, vol. 40, pp. 473-477.
Kamigaito et al., Olefin Polymerization with Me4Cp-amido Complexes with Electron-withdrawing Groups, Journal of Polymer Science, Part A: Polymer Chemistry, 2000, vol. 38, No. S1, pp. 4649-4660.
Kato et al., Synthesis of Novel ansa-Metallocene Complex with Bridged Bis(indenyl) Ligand and Its Application for Olefin Polymerization, Studies in Surface and Catalysis, 1999, vol. 121 (Science and Technology in Catalysis (1998), pp. 473-476.

Kirby et al., Phase Behavior of Polymers in Supercritical Fluid Solvents, Chem. Rev., 1999, 99, pp. 565-602.

Knüppel, et al., Probing the Dynamic Features of Bis(aminocyclopentadienyl) and Bis(aminoindenyl) Zirconium Complexes, Organometallics, 2000, vol. 19, pp. 1262-1268.

Kravchenko, et al., Propylene Polymerization with Chiral and Achiral Unbridged 2-Arylindene Metallocenes, Organometallics, 1997, vol. 16, pp. 3635-3639.

Lahelin et al., Propylene Polymerization with rac-SiMe$_2$(2-ME-4-PhInd)$_2$ZrMe$_2$/MAO: Polymer Characterization and Kinetic Models, Macromol. Chem. Phys., 2003, v. 204, pp. 1323-1337.

Larsonneur et al., Synthesis, Characterization, and Chemical Reactivity of Zirconium Dihydride [(C$_5$H$_4$R)$_2$Zr(μ-H)H$_2$ (R= SiMe$_3$, CMe$_3$). H/D Exchange Reactions of Anionic Species [(C$_5$H$_4$R)$_2$ZrH$_2$]. X-ray Crystal Structure of [(C$_5$H$_4$SiMe$_3$)$_2$Zr(μ-H)H]$_2$, Organometallics, 1993, vol. 12, pp. 3216-3224.

Lee et al., Copolymerizations of Olefins and Dienes with Homogeneous and Heterogeneous Catalysts, Eur. Polym. J., vol. 33(4), 1997, pp. 447-451 (German).

Lehmus et al., Metallocene-PP Produced Under Supercritical Polymerization Conditions,, http://www.chemistry.unina.it/jlpo/bluesky/first_bluesky/list_of_posters.htm pp. 1-10.

Linnolahti et al., theoretical Study on the Factors Controlling the Accessibility of Cationic Metal Centers in Zirconocene Polymerization Catalysts, Macromolecules, 2000, vol. 33, pp. 9205-9214.

Lofgren et al., Metallocene-PP Produced Under Supercritical Conditions, 1$^{st}$ Blue Sky Conference on Catalytic Olefin Polymerization, Jun. 17-20, 2002, Sorrento, Italy, 2002.

Luft, Development of Metallocene Catalysts and Their Application in the High Pressure Polymerisation Process, Darmstadt University of Technology, PE 1999, World Congress Global Technology Update Forum, Mar. 15-16, 1999, Zurich, Switzerland.

Ogasawara et al., Metathesis Route to Bridged Metallocenes, J. Am. Chem. Soc., 2002, vol. 124, pp. 9068-9069.

Piccolrovazzi et al., Electronic Effects in Homogeneous Indenylzirconium Ziegler-Natta Catalysts, Organometallics, 1990, vol. 9, No. 12, pp. 3098-3105.

Plenio, et al., Aminozirconocenes: A New class of Zirconocenese with a Nitrogen Atom Directly Bonded to an $\eta^5$-cyclopentadienyl (indenyl) ligand, J. Organometallic Chem., 1996, vol. 519, pp. 269-272.

Rausch et al., The Formation of Ring-substituted Titanocene Derivatives Containing Chloro and Carbomethoxy Substituents, Journal of Organometallic Chemistry, Elsevier-Sequoia S.A. Lausanne, CH, Dec. 20, 1988, vol. 358, No. 103, pp. 161-168.

Resconi et al., Selectivity in Propene Polymerization with Metallocene Catalysts, Chem. Rev. 2000, vol. 100, pp. 1253-1345.

Resconi et al., Highly Regiospecific Zirconocene Catalysts for the Isospecific Polymerization of Propene, J. Amer. Chem. Soc., 1998, 120, pp. 2308-2321.

Resconi et al., rac-[Methylene(3-tert-butyl-1-indenyl)$_2$]ZrCl$_2$: A Simple, High-Performance Zirconocene Catalyst for Isotactic Polypropene, Organometallics, 2000, 19, pp. 420-429.

Rheingold et al., Preparation and Properties of Chiral Titanocene and Zirconocene Dichloride Complexes of a Chiral Ligand, Organometallics, 1992, vol. 11, pp. 1869-1876.

Ryabov et al., Zirconium Complexes with Cyclopentadienyl Ligands Involving Fused a thiophene Fragment, Organometallics, 2002, vol. 21, pp. 2842-2855.

Schäfer et al., ansa-Metallocene Derivatives, XII. Diastereomeric Derivatisation and Enantiomer Separation of Ethylenebis (Tetrahydroindenyl)-Titanium and -Zirconium Dichlorides, Journal of Organometallic Chemistry, 1987, vol. 328, No. 1-2, pp. 87-99.

Schaverien et al., Ethylene Bis(2-Indenyl)Zirconocene: A New Class of Diastereomeric Metallocenes for the (Co) Polymerization of Alpha-Olefins, Organometallics, 2001, vol. 20, No. 16, pp. 3436-3452.

Schmid et al., Unbridged Cyclopentadienyl-fluorenyl Complexes of Zirconium as Catalysts for Homogeneous Olefin Polymerization, Journal of Organometallic Chemistry, 1995, vol. 501, No. 1-2, pp. 101-106.

Scollard et al., Polymerization of α-Olefins by Chelating Diamid Complexes of Titanium, Macromolecules, 1996, vol. 29, pp. 5241-5243.

Siedle et al., Synthesis of Unsymmetrical Ansa-Fluorenyl Metallocenes, Journal of Molecular Catalysis, 2004, vol. 214, No. 2, pp. 187-198.

Smith et al., Thermodynamic Data for Pure Compounds Part A, Hydrocarbons and Ketones Physical Sciences Data, vol. 25, Elsevier, New York, 1986, pp. 308-309.

Spalek et al., The Influence of Aromatic Substituents on the Polymerization Behavior of Bridged Zirconocene Catalysts, Organometallics, 1994, 13, pp. 954-963.

Stephenson et al., Handbook of the Thermodynamics of Organic Compounds, Elsevier Science Publ. NY, p. 75.

Stratton, Waxes, in Encyclo. Polymer Science and Eng., vol. 17, pp. 784-795, 2$^{nd}$ Edition.

Suzuki et al., Olefin Polymerization Using Highly Congested ansa-Metallocene under High Pressure: Formation of Superhigh Molecular Weight Polyolefins, Macromolecules, 2000, vol. 33, pp. 754-759.

Yamasaki et al., Novel High performance ansa-Zirconocene Catalysts for Isospecific Polymerization of Propylene, Chem. Letters, 1999, pp. 1311-1312.

Yano et al., Homo- and Copolymerization of Ethylene at High Temperature with Cationic Zirconocene Catalysts, Macromol. Chem. Phys. 200, No. 4, pp. 917-923 (Wiley-VCH Verlag GmbH, 1999).

Yano et al., Homo- and Copolymerization of Ethylene at by Cationic Hafnocene Catalysts based on Tetrakis(pentafluorophenyl), Macromol. Chem. Phys. 200, No. 4, 1999, pp. 924-932 (Wiley-VCH Verlag GmbH).

Yano et al., Novel Zirconocene Catalysts for the Production of High Molecular Weight LLDPE in High Temperature Polymerization, Macromol. Chem. Phys. 200, No. 4, 1999, pp. 933-941 (Wiley-VCH Verlag GmbH).

Yano et al., Ethylene/1-Hexene Copolymerization with Ph$_2$C(Cp)(Flu)ZrCl$_2$ Derivatives: Correlation Between Ligand Structure and Copolymerization Behavior at High Temperature, Macromolecular Chemistry and Physics, 1999, vol. 200, No. 6, pp. 1542-1553.

Waldbaum et al., Novel Organoiron Compounds Resulting From the Attempted Syntheses of Dibenzofulvalene Complexes, Inorganica Chimica Acta, 1999, vol. 291, No. 1-2, pp. 109-126.

Walther et al., Metallocene-Catalyzed Polymerisation in Supercritical Propylene, Sep. 22-25, 2002, Venice, Italy, High Pressure in Venice, 4$^{th}$ International Symposium on High Pressure Process Technology and Chemical Engineering.

Wild et al., ansa-Metallocene Derivatives, IV, Synthesis and Molecular Structures of Chiral ansa-Titanocene Derivatives with Bridged Tetrahydroindenyl Ligands, Journal of Organometallic Chemistry, 1982, vol. 232, pp. 233-247.

Wunderlich, Editor, Thermal Analysis, Academic Press Inc., 1990, pp. 418.

Lee et al., Copolymerizations of Olefins and Dienes with Homogeneous and Heterogeneous Catalysts, Eur. Polym. J., vol. 33(4), 1997, pp. 447-451.

Lofgren et al., Metallocene-PP Produced Under Supercritical Conditions, 1$^{st}$ Blue Sky Conference on Catalytic Olefin Polymerization, Jun. 17-20, 2002, Sorrento, Italy, 2002—ABSTRACT.

Yamazaki et al., Novel High performance ansa-Zirconocene Catalysts for Isospecific Polymerization of Propylene, Chem. Letters, 1999, pp. 1311-1312.

* cited by examiner

POLYMER PRODUCTION AT SUPERSOLUTION CONDITIONS

PRIORITY CLAIM

This application claims priority to and the benefit of 60/933,007, filed Jun. 4, 2007. This application is also a continuation-in-part of co-pending application having U.S. Ser. No. 10/667,585, filed on Sep. 22, 2003, (now granted as U.S. Pat. No. 7,354,979) which claims priority to U.S. Ser. No. 60/412,541, filed Sep. 20, 2002. This application is also a continuation in part of U.S. Ser. No. 11/714,546, filed Mar. 6, 2007.

STATEMENT OF RELATED CASES

This application is related to U.S. Ser. No. 10/667,585, filed Sep. 22, 2003, now U.S. Pat. No. 7,354,979 which claims priority to and the benefit of U.S. Ser. No. 60/412,541, filed Sep. 20, 2002 and U.S. Ser. No. 60/431,077, filed Dec. 5, 2002.

This application is also related to U.S. Ser. No. 10/667,586, filed Sep. 23, 2003, now U.S. Pat. No. 7,319,125 which claims priority to and the benefit of U.S. Ser. No. 60/412,541, filed Sep. 20, 2002 and U.S. Ser. No. 60/431,077, filed Dec. 5, 2002.

This application is also related to U.S. Ser. No. 11/510,871, filed Aug. 25, 2006, now U.S. Pat. No. 7,279,536, which is a continuation-in-part of U.S. Ser. No. 11/177,004 filed Jul. 8, 2005 (now abandoned), which claims the benefit of U.S. Ser. No. 60/586,465, filed Jul. 8, 2004. U.S. Ser. No. 11/177,004, now abandoned, is a continuation in part of U.S. Ser. No. 10/667,585, filed Sep. 22, 2003, now U.S. Pat. No. 7,354,979, which claims the benefit of U.S. Ser. No. 60/412,541, filed Sep. 20, 2002, and claims the benefit of U.S. Ser. No. 60/431,077, filed Dec. 5, 2002. U.S. Ser. No. 11/177,004, is also a continuation-in-part of U.S. Ser. No. 10/667,586, filed Sep. 22, 2003, now U.S. Pat. No. 7,319,125, which claims the benefit of U.S. Ser. No. 60/412,541, filed Sep. 20, 2002, and claims the benefit of U.S. Ser. No. 60/431,077, filed Dec. 5, 2002.

This application is also related to U.S. Ser. No. 60/876,193, filed Dec. 20, 2006.

FIELD OF THE INVENTION

This invention relates to polymerization of propylene under supersolution conditions using a nonmetallocene, metal-centered, heteroaryl ligand catalyst compound.

BACKGROUND OF THE INVENTION

Polymerization of propylene is commercially useful, therefore there is a need in the art for more efficient propylene polymerization processes. State-of-the-art commercial processes polymerize propylene in particle-forming processes, known in the art as gas phase and slurry polymerization. These processes are very efficient for making polypropylenes, but they are unable to produce blends of polypropylene and other polymers in-line, i.e., before the individual polymer blend components are recovered in their essentially neat state. For that reason, state-of-the-art processes for producing polyolefin blends, particularly blends of polypropylene with other polymers, such as, for example, ethylene-propylene, or ethylene-hexene-1, etc., copolymers, blend fully-recovered, typically granulated polypropylene with other fully-recovered, typically granulated polyolefin blend components via melt-blending. However, melt-blending is expensive and not perfectly homogeneous, due to the difficulty of blending the highly viscous molten polymers. Solution polymerization would be able to make the polypropylene component in a dissolved fluid state, suitable for blending with other polymers also produced in a dissolved state. However, the molecular weight and the thermal properties of polypropylene made in a solution process are often unacceptable for producing commercially useful polymer blends. Thus, there is a need for an improved solution process for the production propylene-containing polymers, particularly, polypropylenes, to enable solution operations amenable for in-line polymer blending without unacceptable deterioration in the performance of the polypropylene blend component. The disclosed supersolution processes overcome these limitations of the current state of the art and are able to produce polypropylenes that combine excellent (low) melt-flow rate and high melting and crystallization temperatures. There are several processes disclosed that operate in homogeneous state amenable for in-line polymer blending in solution. However, they are either deficient in product quality or are too expensive and thus commercially not practical.

U.S. Pat. No. 6,084,041, granted to Andtsjo et al., discloses supercritical propylene polymerization under relatively mild conditions (90° C. to 100° C. and less than 6.89 MPa pressure) using supported Ziegler-Natta and metallocene catalysts.

WO 93/11171 discloses a polyolefin production process that comprises continuously feeding olefin monomer and a metallocene catalyst system into a reactor. The monomer is continuously polymerized to provide a monomer-polymer mixture. Reaction conditions keep this mixture at a pressure below the system's cloud-point pressure. These conditions create a polymer-rich and a monomer-rich phase and maintain the mixture's temperature above the polymer's melting point. The formation of the viscous polymer-rich phase tends to make reactor and downstream operations problematic due to fouling, unintended bulk phase separation, and poor heat transfer.

WO 03/040201 discloses polymerization or propylene with nonmetallocene metal-centered, heteroaryl ligand catalyst compounds under non-supersolution conditions.

Other references of interest include: *Olefin Polymerization Using Highly Congested ansa-Metallocenes under High Pressure: Formation of Superhigh Molecular Weight Polyolefins*, Suzuki, et al., Macromolecules, 2000, 33, 754-759, EP 1 123 226, WO 00 12572, WO 00 37514, EP 1 195 391, and *Ethylene Bis(Indenyl) Zirconocenes . . .*, Schaverien, C. J. et al., Organometallics, ACS, Columbus Ohio, vol 20, no. 16, August 2001, pg 3436-3452, WO 96/34023, WO 97/11098, U.S. Pat. No. 5,084,534, U.S. Pat. No. 2,852,501, WO 93/05082, EP 129 368 B1, WO 97/45434, JP 96-208535, U.S. Pat. No. 5,096,867, WO 96/12744, U.S. Pat. No. 6,225,432, WO 02/090399, WO 02/50145, US 2002 013440, WO 01/46273, EP 1 008 607, JP-1998-110003A, U.S. Pat. No. 6,562,914, and JP-1998-341202B2, U.S. Pat. No. 5,756,608, U.S. Pat. No. 5,969,062 U.S. Pat. No. 5,408,017, U.S. Pat. No. 6,355,741, WO 92/14766, U.S. Pat. No. 5,326,835, WO/2004-026921 and CA 2,118,711 (equivalent to DE 4,130,299).

WO 02/38628 describes nonmetallocene, metal-centered, heteroaryl ligand catalyst compounds and various uses therefor. WO2006/009976 discloses polymerizations in fluorocarbons with various nonmetallocene, metal-centered, heteroaryl ligand catalyst compounds. Further, WO03/040095, WO 03/040202; WO 03/040233; WO 03/040442; and U.S. Pat. No. 7,087,690, describe nonmetallocene, metal-centered, heteroaryl ligand catalyst compounds, their polymer products, and various uses therefor.

WO 94/00500, WO 2007/037944 and Macromol. Chem. Phys. 204 (2003), 1323-1337 disclose various solution processes to make polypropylene.

SUMMARY OF THE INVENTION

This invention relates to a process to polymerize olefins comprising contacting propylene, at a temperature of 65° C. to 150° C. and a pressure of between 250 to 5,000 psi (1.72 to 34.5 MPa), with:
1) a catalyst system comprising one or more activators and one or more nonmetallocene metal-centered, heteroaryl ligand catalyst compounds, where the metal is chosen from the Group 4, 5, 6, the lanthanide series, or the actinide series of the Periodic Table of the Elements,
2) 0 to 20 wt % of one or more comonomers (based upon the weight of all monomers and comonomers present in the feed) selected from the group consisting of ethylene and C4 to C12 olefins,
3) from 20 to 65 wt % diluent or solvent, based upon the total weight of feeds to the polymerization reactor, and
4) 0 to 5 wt % scavenger, based upon the total weight of feeds to the polymerization reactor, wherein:
  a) the olefin monomers and any comonomers are present in the polymerization system at 15 wt % or more,
  b) the propylene is present at 80 wt % or more based upon the weight of all monomers and comonomers present in the feed,
  c) the polymerization occurs at a temperature above the solid-fluid phase transition temperature of the polymerization system and above a pressure greater than 1 MPa below the cloud point pressure of the polymerization system, provided however that the polymerization occurs: (1) at a temperature below the critical temperature of the polymerization system, or (2) at a pressure below the critical pressure of the polymerization system.

The polymerization system is the olefin monomers, any comonomer present, any diluent or solvent present, any scavenger present, and the polymer product.

DEFINITIONS

For purposes of this invention and the claims thereto:
1. A catalyst system is defined to be the combination of one or more catalyst compounds and one or more activators. The term "catalyst compound" is used interchangeably herein with the terms "catalyst," "catalyst precursor," and "catalyst precursor compound."
2. A dense fluid is a fluid having a density of at least 300 kg/m$^3$.
3. The solid-fluid phase transition temperature is defined as the temperature below which a solid polymer phase separates from the homogeneous polymer-containing fluid medium at a given pressure. The solid-fluid phase transition temperature can be determined by temperature reduction at constant pressure starting from temperatures at which the polymer is fully dissolved in the fluid medium. The phase transition is observed as the system becoming turbid, when measured using the method described below for determining cloud point.
4. The solid-fluid phase transition pressure is defined as the pressure below which a solid polymer phase separates from the polymer-containing fluid medium at a given temperature. The solid-fluid phase transition pressure is determined by pressure reduction at constant temperature starting from pressures at which the polymer is fully dissolved in the fluid medium. The phase transition is observed as the system becoming turbid, when measured using the method described below for determining cloud point.
5. The fluid-fluid phase transition pressure is defined as the pressure below which two fluid phases—a polymer-rich phase and a monomer rich phase—form at a given temperature. The fluid-fluid phase transition pressure can be determined by pressure reduction at constant temperature starting from pressures at which the polymer is fully dissolved in the fluid medium. The phase transition is observed as the system becoming turbid, when measured using the method described below for determining cloud point.
6. The fluid-fluid phase transition temperature is defined as the temperature below which two fluid phases—a polymer-rich phase and a monomer rich phase—form at a given pressure. The fluid-fluid phase transition pressure can be determined by temperature reduction at constant pressure starting from temperatures at which the polymer is fully dissolved in the fluid medium. The phase transition is observed as the system becoming turbid, when measured using the method described below for determining cloud point.
7. The cloud point is the pressure below which, at a given temperature, the polymerization system becomes turbid as described in J. Vladimir Oliveira, C. Dariva and J. C. Pinto, Ind. Eng, Chem. Res. 29, 2000, 4627. For purposes of this invention and the claims thereto, the cloud point is measured by shining a helium laser through the selected polymerization system in a cloud point cell onto a photocell and recording the pressure at the onset of rapid increase in light scattering for a given temperature. Cloud point pressure is the point at which at a given temperature, the polymerization system becomes turbid. Cloud point temperature is the point at which at a given pressure, the polymerization system becomes turbid. It should be noted that although both the cloud point pressure and cloud point temperature are well-defined physical properties, in the area of polymer engineering, "cloud point" typically refers to the cloud point pressure.
8. A higher α-olefin is defined to be an α-olefin having 4 or more carbon atoms.
9. The use of the term "polymerization" encompasses any polymerization reaction such as homopolymerization and copolymerization.
10. A copolymerization encompasses any polymerization reaction of two or more monomers.
11. The new numbering scheme for the Periodic Table Groups is used as published in CHEMICAL AND ENGINEERING NEWS, 63(5), 27 (1985).
12. When a polymer or oligomer is referred to as comprising an olefin, the olefin present in the polymer or oligomer is the polymerized or oligomerized form of the olefin.
13. An oligomer is defined to be compositions having 2-120 monomer units.
14. A polymer is defined to be compositions having 121 or more monomer units.
15. A polymerization system is defined to be monomer(s) plus comonomer(s) plus polymer(s) plus optional inert solvent(s)/diluent(s) plus optional scavenger(s). Note that for the sake of convenience and clarity, the catalyst system is always addressed separately in the present discussion from other components present in a polymerization reactor. In this regard, the polymerization system is defined here narrower than customary in the art of polymerization that typically considers the catalyst system as part of the polymerization system. In the current definition, the mixture present in the polymerization reactor and in its effluent is composed of the polymerization system plus the catalyst system.

16. To be in the supercritical state, a substance must have a temperature above its critical temperature (Tc) and a pressure above its critical pressure (Pc). If not measured, critical temperatures (Tc) and critical pressures (Pc) are those that found in the Handbook of Chemistry and Physics, David R. Lide, Editor-in-Chief, 82nd edition 2001-2002, CRC Press, LLC, New York, 2001. In particular, the Tc and Pc of propylene are 364.9° K and 4.6 MPa. In the event a Tc and/or Pc cannot be measured for a given system, then the Tc and/or Pc will be deemed to be the Tc and/or Pc of the mole fraction weighted averages of the corresponding Tc's and Pc's of the system components.

17. The following abbreviations are used: Me is methyl, Ph is phenyl, Et is ethyl, Pr is propyl, iPr is isopropyl, n-Pr is normal propyl, Bu is butyl, iBu is isobutyl, tBu is tertiary butyl, p-tBu is para-tertiary butyl, TMS is trimethylsilyl, TIBA is trisobutylaluminum, MAO is methylalumoxane, pMe is para-methyl, flu is fluorenyl, cp is cyclopentadienyl, Ind is indenyl.

18. The term "continuous" is defined to mean a system that operates without interruption or cessation. For example a continuous process to produce a polymer would be one where the reactants are continually introduced into one or more reactors and polymer product is continually withdrawn.

19. A slurry polymerization means a polymerization process in which particulate, solid polymer forms in a dense fluid or in a liquid/vapor polymerization medium. The dense fluid polymerization medium can form a single or two fluid phases, such as liquid, or supercritical fluid, or liquid/liquid, or supercritical fluid/supercritical fluid polymerization medium. In the liquid/vapor polymerization medium the polymer resides in the liquid (dense fluid) phase.

20. A solution polymerization means a polymerization process in which the polymer is dissolved in a liquid polymerization system, such as an inert solvent or monomer(s) or their blends. A solution polymerization is typically a homogeneous liquid polymerization system.

21. A supercritical polymerization means a polymerization process in which the polymerization system is in a dense, supercritical state.

22. A bulk polymerization means a polymerization process in which a dense fluid polymerization system contains less than 40 wt % of inert solvent or diluent. The product polymer may be dissolved in the dense fluid polymerization system or may form a solid phase. In this terminology, a slurry polymerization, in which solid polymer particulates form in a dense fluid polymerization system containing less than 40 wt % of inert solvent or diluent, is referred to as a bulk slurry polymerization process or bulk heterogeneous polymerization process. A polymerization process in which the polymeric product is dissolved in a dense fluid polymerization system containing less than 40 wt % of inert solvent or diluent is referred to as bulk homogeneous polymerization process. A polymerization process in which the polymeric product is dissolved in a liquid polymerization system containing less than 40 wt % of inert solvent or diluent is referred to as bulk solution polymerization process. A polymerization process in which the polymeric product is dissolved in a supercritical polymerization system containing less than 40 wt % of inert solvent or diluent is referred to as bulk homogeneous supercritical polymerization process.

23. Homogeneous polymerization or a homogeneous polymerization system is a polymerization system where the polymer product is uniformly dissolved in the polymerization medium. Such systems are not turbid as described in J. Vladimir Oliveira, C. Dariva and J. C. Pinto, Ind. Eng, Chem. Res. 29, 2000, 4627. For purposes of this invention and the claims thereto, turbidity is measured by shining a helium laser through the selected polymerization system in a cloud point cell onto a photocell and determining the point of the onset of rapid increase in light scattering for a given polymerization system. Uniform dissolution in the polymerization medium is indicated when there is little or no light scattering (i.e. less than 5% change).

24. The term "NMCHL catalyst compound" means nonmetallocene, metal-centered, heteroaryl ligand catalyst compound.

Unless otherwise noted, all molecular weights units (e.g., Mw, Mn, Mz) are g/mol and all ppm's are wt ppm.

DETAILED DESCRIPTION OF THE INVENTION

This invention relates to a process to polymerize olefins comprising contacting propylene, at a temperature of 65° C. to 150° C. (preferably 70° C. to 150° C., preferably 75° C. to 140° C., preferably between 100° C. to 140° C.) and a pressure of between 1.72 MPa and 34.5 MPa (preferably between 2 and 30 MPa, preferably between 5 and 25 MPa), with:

1) a catalyst system comprising one or more activators and one or more nonmetallocene metal-centered, heteroaryl ligand catalyst compounds, where the metal is chosen from the Group 4, 5, 6, the lanthanide series, or the actinide series of the Periodic Table of the Elements (preferably group 4, preferably Hf, Ti, or Zr), 2) from 0 to 20 wt % (alternately from 0.5 to 15 wt %, alternately from 1 to 10 wt %, alternately from 1 to 5 wt %) of one or more comonomers, based upon the weight of the polymerization system, selected from the group consisting of ethylene and C4 to C12 olefins (alternately comonomer may be present in the feed at 0.1 to 20 wt %), 3) from 20 to 65 wt % (alternately from 25 to 60 wt %, alternately from 30 to 55 wt %) diluent or solvent (based upon the total weight of feeds to the polymerization reactor), and 4) from 0 to 5 wt % (alternately from 0 to 1 wt %, alternately from 0.001 to 0.01 wt %) scavenger, preferably one or more alkyl aluminum compounds (based upon the weight of the polymerization system) and/or from 0 to 25 wt % (alternately from 0 to 5 wt %, alternately from 0 to 1 wt %, alternately from 0.001 to 0.01 wt %) scavenger, preferably one or more alkyl aluminum compounds (based upon the total weight of feeds to the polymerization reactor), wherein:

a) the propylene and any comonomers are present in the polymerization system at 15 wt % or more, preferably, 20 wt % or more, (preferably 25 wt % or more, preferably 30 wt % or more, preferably 35 wt % or more, preferably 40 wt % or more, preferably 45 wt % or more, preferably 50 wt % or more, preferably 55 wt % or more, preferably between 30 and 75 wt %), b) the propylene is present at (75 wt % or more, preferably at 80 wt % or more, preferably 85 wt % or more, preferably 90 wt % or more, preferably 95 wt % or more) based upon the weight of all monomers and comonomers present in the feed, and/or the propylene is present in the polymerization system at 20 wt % or more, preferably 25 wt % or more, preferably 30 wt % or more, preferably 35 wt % or more, preferably 40 wt % or more, c) the polymerization occurs at a temperature above the solid-fluid phase transition temperature of the polymerization system and a pressure greater than 1 MPa below the cloud point pressure (CPP) of the polymerization system (preferably greater than 0.5 MPa below the CPP, preferably greater than the CCP), and d) the polymerization occurs: (1) at a temperature below the critical temperature of the polymerization system, or (2) at a pressure below the critical pressure of the polymerization system, preferably the polymerization occurs at a pressure and temperature below the critical point of the polymerization system, most preferably the polymerization occurs: (1) at a temperature below the critical temperature of the polymerization system, and (2) at a pressure below the critical pressure of the polymerization system.

Preferably, the polymerization occurs at a temperature and pressure above the solid-fluid phase transition temperature and pressure of the polymerization system. Alternately, the polymerization occurs at a temperature and pressure above the fluid-fluid phase transition temperature and pressure of the polymerization system. Alternately, the polymerization occurs at a temperature and pressure below the fluid-fluid phase transition temperature and pressure of the polymerization system. The polymerization system is preferably a homogeneous, single phase polymerization system, preferably a homogeneous dense fluid polymerization system.

The polymerization reaction typically is carried out at conditions where the product polymer is dissolved in the fluid reaction system comprising one or more monomers, the polymeric products, and—optionally—one or more inert solvents, and—optionally—one or more scavengers. The fluid reaction medium can form one single fluid phase or two fluid phases. Operating in a single fluid phase is particularly advantageous.

In a useful embodiment, any hydrocarbon, fluorocarbon, or fluorohydrocarbon inert solvent or mixtures thereof can be used at concentrations of up to 70 wt % in the feeds (preferably up to 65 wt %, more preferably up to 55 wt %) to any individual polymerization reactor in the process of the present invention.

In an alternate embodiment the solvent or diluent is present at from 0 to 80 wt % (alternately from 5 to 70 wt %, alternately from 10 to 70 wt %, alternately from 25 to 70 wt %, alternately from 60 to 65 wt %) diluent or solvent (based upon the weight of the polymerization system).

Preferably the polymerizations described herein are homogeneous polymerizations. Although solid catalysts can be applied if so desired, polymerization with dissolved catalysts in a single liquid phase is typically advantageous and in a single fluid phase is particularly advantageous. The polymerizations performed herein are performed at a pressure and temperature below the critical point and, preferably, the cloud point is below the critical point. In systems the critical point cannot be determined, then the critical point shall be calculated from the weighted averages of the individual components.

The reaction temperature is preferably below the critical temperature of the polymerization system. Preferably, the temperature is above the solid-fluid phase transition temperature of the polymer-containing fluid reaction medium at the reactor pressure or at least 5° C. above the solid-fluid phase transition temperature of the polymer-containing fluid reaction medium at the reactor pressure, or at least 10° C. above the solid-fluid phase transformation point of the polymer-containing fluid reaction medium at the reactor pressure. In another embodiment, the temperature is above the cloud point of the single-phase fluid reaction medium at the reactor pressure, or 2° C. or more above the cloud point of the fluid reaction medium at the reactor pressure. In yet another embodiment, the temperature is between 60° C. and 150° C., between 60° C. and 140° C., between 70° C. and 130° C., or between 80° C. and 130° C. In one embodiment, the temperature is above 60° C., 65° C., 70° C., 75° C., 80° C., 85° C., 90° C., 95° C., 100° C., 105° C., or 110° C. In another embodiment, the temperature is below 150° C., 140° C., 130° C., or 120° C. In another embodiment, the cloud point temperature is below the supercritical temperature of the polymerization system or between 70° C. and 150° C.

The processes of this invention preferably occur in a dense fluid polymerization medium, preferably in a homogeneous liquid polymerization medium above the cloud point of the polymerization medium.

Useful diluents for use in the present invention include one or more of $C_2$-$C_{24}$ alkanes, such as ethane, propane, n-butane, i-butane, n-pentane, i-pentane, n-hexane, mixed hexanes, mixed octanes, cyclopentane, cyclohexane, etc., single-ring aromatics, such as toluene and xylenes. The use of hydrocarbon solvents having 4 to 12 carbon atoms is advantageous, the use of alkane or aromatic hydrocarbon solvents having 4 to 8 carbon atoms is particularly advantageous. In some embodiments the diluent comprises one or more of ethane, propane, butane, isobutane, isopentane, and/or hexanes. In any embodiment described herein the diluent may be recyclable.

Additional useful diluents also include $C_4$ to $C_{150}$ isoparaffins, preferably $C_4$ to $C_{100}$ isoparaffins, preferably $C_4$ to $C_{25}$ isoparaffins, more preferably $C_4$ to $C_{12}$ isoparaffins. By isoparaffin is meant that the paraffin chains possess $C_1$ to $C_6$ alkyl branching along at least a portion of each paraffin chain.

In another embodiment, the diluent comprises a fluorinated hydrocarbon. Preferred fluorocarbons for use in this invention include perfluorocarbons ("PFC" or "PFC's") and or hydrofluorocarbons ("HFC" or "HFC's"), collectively referred to as "fluorinated hydrocarbons" or "fluorocarbons" ("FC" or "FC's"). Fluorocarbons are defined to be compounds consisting essentially of at least one carbon atom and at least one fluorine atom, and optionally hydrogen atom(s). A perfluorocarbon is a compound consisting essentially of carbon atom and fluorine atom, and includes for example linear branched or cyclic, $C_1$ to $C_{40}$ perfluoroalkanes. A hydrofluorocarbon is a compound consisting essentially of carbon, fluorine and hydrogen. Preferred FC's include those represented by the formula: $C_xH_yF_z$ wherein x is an integer from 1 to 40, alternately from 1 to 30, alternately from 1 to 20, alternately from 1 to 10, alternately from 1 to 6, alternately from 2 to 20 alternately from 3 to 10, alternately from 3 to 6, most preferably from 1 to 3, wherein y is an integer greater than or equal to 0 and z is an integer and at least one, more preferably, y and z are integers and at least one. For purposes of this invention and the claims thereto, the terms hydrofluorocarbon and fluorocarbon do not include chlorofluorocarbons.

In one embodiment, a mixture of fluorocarbons are used in the process of the invention, preferably a mixture of a perfluorinated hydrocarbon and a hydrofluorocarbon, and more preferably a mixture of a hydrofluorocarbons. In yet another embodiment, the hydrofluorocarbon is balanced or unbalanced in the number of fluorine atoms in the HFC used.

Non-limiting examples of fluorocarbons useful in this invention include any of the fluorocarbons listed at page 65, line 10 to page 66, line 31 of WO 2006/009976. In addition to those fluorocarbons described herein, those fluorocarbons described in Raymond Will, et al., CEH Marketing Report, Fluorocarbons, Pages 1-133, by the Chemical Economics Handbook-SRI International, April 2001, which is fully incorporated herein by reference, are included.

Monomers

The process described herein can be used to polymerize any monomer having one or more (non-conjugated) aliphatic double bond(s) and two or more carbon atoms. Preferred monomers include α-olefins, such as ethylene, propylene, butene-1, hexene-1, octene-1, dodecene-1, and decene-1, substituted olefins, such as styrene, vinylcyclohexane, etc., non-conjugated dienes, such as vinylcyclohexene, etc., α,ω-dienes, such as 1,5-hexadiene, 1,7-octadiene, etc., cycloolefins, such as cyclopentene, cyclohexene, etc., norbornene, and the like.

In a preferred embodiment the processes described herein may be used to produce homopolymers or copolymers. (For the purposes of this invention and the claims thereto a copolymer may comprise two, three, four or more different monomer units.) In one embodiment, the polymer is a homopolymer or co-polymer of propylene. Preferably the polymer is a homopolymer of propylene. In another embodiment, the polymer is a copolymer comprising propylene and ethylene, preferably the copolymer comprises less than 50 wt % ethylene, more preferably less than 40 wt % ethylene, preferably the copolymer comprises less than 30 wt % ethylene, more preferably less than 20 wt % ethylene. In another preferred embodiment, the copolymers produced herein are copolymers of propylene and up to 10 wt % of a comonomer (preferably up to 8 wt %, preferably up to 6 wt %, preferably up to 5 wt %, preferably up to 4 wt %, preferably up to 3 wt %, preferably up to 2 wt %), based upon the weight of the copolymer. In an alternate embodiment, the copolymers produced here contain less than 1 wt % ethylene, preferably 0% ethylene. In another preferred embodiment, the copolymers comprises one or more diolefin comonomers, preferably one or more $C_6$ to $C_{40}$ non-conjugated diolefins, more preferably $C_6$ to $C_{40}$ α,ω-dienes.

In another preferred embodiment, the copolymers produced herein are copolymers of propylene and up to 10 wt % of a comonomer (preferably up to 8 wt %, preferably up to 6 wt %, preferably up to 5 wt %, preferably up to 4 wt %, preferably up to 3 wt %, preferably up to 2 wt %), based upon the weight of the copolymer. In an alternate embodiment, the copolymers produced here contain less than 1 wt % ethylene, preferably 0% ethylene.

In a preferred embodiment the polymers described above further comprise one or more dienes at up to 10 wt %, preferably at 0.00001 to 1.0 wt %, preferably 0.002 to 0.5 wt %, even more preferably 0.003 to 0.2 wt %, based upon the total weight of the composition. In some embodiments 500 wt ppm or less of diene is added to the polymerization, preferably 400 ppm or less, preferably or 300 ppm or less. In other embodiments at least 50 ppm of diene is added to the polymerization, or 100 ppm or more, or 150 ppm or more.

Catalyst Introduction

The processes described herein are practiced with a catalyst system comprising one or more nonmetallocene metal-centered, heteroaryl ligand catalyst compounds (where the metal is chosen from the Group 4, 5, 6, the lanthanide series, or the actinide series of the Periodic Table of the Elements) in combination with an activator. The process of the present invention can use one or more catalysts in any of the reactors of the polymerization reactor section or in any polymerization described herein.

The process of the present invention can use the same or different catalysts or catalyst mixtures in the different individual reactors of the reactor section of the present invention. For practical reasons, the deployment of no more than ten catalysts is preferred and the deployment of no more than six catalysts is more preferred in the polymerization process of the present invention. Further in alternate embodiments, no more than five catalysts are used and no more than three catalysts are used in any given reactor.

The one or more catalysts deployed in the process of the present invention can be homogeneously dissolved in the fluid reaction medium or can form a heterogeneous solid phase in the reactor. Operations with homogeneously dissolved catalysts are advantageous, particularly where unsupported catalyst systems are homogeneously dissolved in the polymerization system. Unsupported catalysts dissolved in the polymerization system are also preferred. When the catalyst is present as a solid phase in the polymerization reactor, it can be supported or unsupported. Silica, silica-alumina and other like supported are particularly useful as supports as further described below. The catalyst can also be supported on structured supports, such as monoliths comprising straight or tortuous channels, reactor walls, internal tubing, etc. These structured supports are well known in the art of heterogeneous catalysis. When the catalyst(s) is (are) supported, operation with dispersed particles is preferred. When the catalyst is supported on dispersed particles, operations without catalyst recovery are preferred, i.e., the catalyst is left in the polymeric product of the process of the present invention.

The process of the present invention can use any combination of homogeneous and heterogeneous catalysts simultaneously present in one or more of the individual reactors of the polymerization reactor section, i.e., any reactor of the polymerization section of the present invention may contain one or more homogeneous catalysts and one or more heterogeneous catalysts simultaneously. Likewise, the process of the present invention can use any combination of homogeneous and heterogeneous catalysts deployed in the polymerization reactor section of the present invention. These combinations comprise scenarios when some or all reactors use a single catalyst and scenarios when some or all reactors use more than one catalyst.

One or more catalysts deployed in the process of the present invention can be supported on particles, which either can be dispersed in the fluid polymerization medium or can be contained in a stationary catalyst bed. When the supported catalyst particles are dispersed in the fluid reaction medium, they can be left in the polymeric product or can be separated from the product prior to its recovery from the fluid reactor effluent in a separation step that is typically downstream of the polymerization reactor section. If the catalyst particles are recovered, they can be either discarded or can be recycled with or without regeneration.

The catalyst(s) can be introduced any number of ways to the reactor. For example, the catalyst(s) can be introduced with the monomer-containing feed or separately. Also, the catalyst(s) can be introduced through one or multiple ports to the reactor. If multiple ports are used for introducing the catalyst(s), those ports can be placed at essentially the same or at different positions along the length of the reactor. Further if multiple ports are used for introducing the catalyst(s), the composition and the amount of catalyst feed through the individual ports can be the same or different. Adjustment in the amounts and types of catalyst through the different ports enables the modulation of polymer properties, such as molecular weight distribution, composition, composition distribution, crystallinity, etc.

In order to reduce catalyst cost, compounds destroying impurities that harm the catalyst(s) thus reducing its (their) activity can be optionally fed to the reactor(s). These impurity-destroying compounds are called scavengers in the practice of polymerization.

Any type of scavenger compounds can be fed to the reactor(s) that can destroy impurities harmful to the catalyst and thus reducing the observed catalytic productivity.

The scavenger can be the same or different chemical compound(s) as applied as catalyst activator. Useful scavengers include alkyl-aluminum compounds including alumoxanes, preferably the scavenger is one or more compounds represented by the formula: $AlR^*_3$, where $R^*$ is a $C_1$ to $C_{20}$ hydrocarbyl group, preferably methyl, ethyl, butyl, hexyl, octyl, nonyl decyl and dodecyl, preferably the scavenger is one or more of trimethyl-aluminum, triethyl-aluminum, tri-isobutyl aluminum, trioctyl-aluminum, and the like. The scavenger also can be the same as the catalyst activator, for example, alumoxanes, such as methylalumoxane (MAO), etc., applied in excess of what is needed to fully activate the catalyst. The scavenger can be introduced to the reactor with the monomer feed or with any other feed stream. Scavenger introduction with the monomer-containing feed is typically advantageous because the scavenger can react with the impurities present in the monomer feed before the monomer feed contacts the catalyst.

The scavenger can be homogeneously dissolved in the polymerization reaction medium or can form a separate solid phase. Scavengers dissolved in the polymerization medium are advantageous.

Catalyst Systems

The processes described herein are practiced with a catalyst system comprising one or more nonmetallocene metal-centered, heteroaryl ligand catalyst compounds (where the metal is chosen from the Group 4, 5, 6, the lanthanide series, or the actinide series of the Periodic Table of the Elements) in combination with an activator. Preferably, the transition metal is from Group 4, especially Ti or Zr or Hf. More specifically, in certain embodiments of the catalyst compound, the use of a hafnium metal is preferred as compared to a zirconium metal for heteroaryl ligand catalysts. For more information on nonmetallocene metal-centered, heteroaryl ligand catalyst compounds please see WO 2006/38628.

The catalyst compounds used in the practice of this invention include catalysts comprising ancillary ligand-hafnium complexes, ancillary ligand-zirconium complexes, which when optionally combined with an activator) catalyze polymerization and copolymerization reactions, particularly with monomers that are olefins, diolefins or other unsaturated compounds. Zirconium complexes, hafnium complexes, compositions or compounds using the disclosed ligands are within the scope of the catalysts useful in the practice of this invention. The metal-ligand complexes may be in a neutral or charged state. The ligand to metal ratio may also vary, the exact ratio being dependent on the nature of the ligand and metal-ligand complex. The metal-ligand complex or complexes may take different forms, for example, they may be monomeric, dimeric or of an even higher order.

For example, suitable ligands useful in the practice of this invention may be broadly characterized by the following general formula (1):

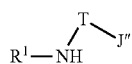

wherein $R^1$ is a ring having from 4-8 atoms in the ring generally selected from the group consisting of substituted cycloalkyl, substituted heterocycloalkyl, substituted aryl and substituted heteroaryl, such that $R^1$ may be characterized by the general formula (2):

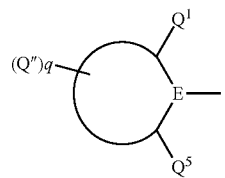

where $Q^1$ and $Q^5$ are substituents on the ring other than to atom E, with E being selected from the group consisting of carbon and nitrogen and with at least one of $Q^1$ or $Q^5$ being bulky (defined as having at least 2 atoms). $Q''_q$ represents additional possible substituents on the ring, with q being 1, 2, 3, 4 or 5 and Q" being selected from the group consisting of hydrogen, alkyl, substituted alkyl, cycloalkyl, substituted cycloalkyl, heteroalkyl, substituted heteroalkyl, heterocycloalkyl, substituted heterocycloalkyl, aryl, substituted aryl, heteroaryl, substituted heteroaryl, alkoxyl, aryloxyl, silyl, boryl, phosphino, amino, thio, seleno, halide, nitro, and combinations thereof. T is a bridging group selected group consisting of —$CR^2R^3$— and —$SiR^2R^3$— with $R^2$ and $R^3$ being independently selected from the group consisting of hydrogen, alkyl, substituted alkyl, cycloalkyl, substituted cycloalkyl, heteroalkyl, substituted heteroalkyl, heterocycloalkyl, substituted heterocycloalkyl, aryl, substituted aryl, heteroaryl, substituted heteroaryl, alkoxyl, aryloxyl, silyl, boryl, phosphino, amino, thio, seleno, halide, nitro, and combinations thereof. J" is generally selected from the group consisting of heteroaryl and substituted heteroaryl, with particular embodiments for particular reactions being described herein.

Also for example, in some embodiments, the ligands of the catalyst used in the practice of this invention may be combined with a metal catalyst compound that may be characterized by the general formula $M(L)_n$ where M is Hf or Zr, preferably Hf, L is independently selected from the group consisting of halide (F, Cl, Br, I), alkyl, substituted alkyl, cycloalkyl, substituted cycloalkyl, heteroalkyl, substituted heteroalkyl, heterocycloalkyl, substituted heterocycloalkyl, aryl, substituted aryl, heteroaryl, substituted heteroaryl, alkoxy, aryloxy, hydroxy, boryl, silyl, amino, amine, hydrido, allyl, diene, seleno, phosphino, phosphine, carboxylates, thio, 1,3-dionates, oxalates, carbonates, nitrates, sulphates, and combinations thereof n is 1, 2, 3, 4, 5, or 6.

Preferred ligand-metal complexes useful herein may be generally characterized by the following formula (3):

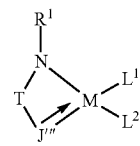

where M is zirconium or hafnium;
$R^1$ and T are as defined above;
J'" being selected from the group of substituted heteroaryls with 2 atoms bonded to the metal M, at least one of those atoms being a heteroatom, and with one atom of J'" is bonded to M via a dative bond, the other through a covalent bond; and
$L^1$ and $L^2$ are independently selected from the group consisting of halide, alkyl, substituted alkyl, cycloalkyl, substituted cycloalkyl, heteroalkyl, substituted heteroalkyl, heterocycloalkyl, substituted heterocycloalkyl, aryl, substituted aryl, heteroaryl, substituted heteroaryl, alkoxy, aryloxy, hydroxy, boryl, silyl, amino, amine, hydrido, allyl, diene, seleno, phosphino, phosphine, carboxylates, thio, 1,3-dionates, oxalates, carbonates, nitrates, sulphates, and combinations of these radicals.

For purposes of this invention, "nonmetallocene" means that the metal of the catalyst is not attached to a substituted or unsubstituted cyclopentadienyl ring. Representative nonmetallocene, metal-centered, heteroaryl ligand catalysts are described in U.S. Provisional Patent Application No. 60/246,781 filed Nov. 7, 2000 and No. 60/301,666 filed Jun. 28, 2001, which are incorporated by reference herein. Additionally, useful nonmetallocene, metal-centered, heteroaryl ligand catalysts (and activators useful therewith) are also described in WO 2003/040201, see particularly page 36, line 18 to page 64 line 30. Also, representative nonmetallocene, metal-centered, heteroaryl ligand catalysts described in U.S. Pat. No. 7,087,690 filed Nov. 25, 2003, are incorporated by reference herein As here used, "nonmetallocene, metal-centered, heteroaryl ligand catalyst" means the catalyst derived from the ligand described in formula (1). As used in this phrase, "heteroaryl" includes substituted heteroaryl. The terms "hydrocarbyl," "substituted hydrocarbyl," "alkyl," "substituted alkyl," "heteroalkyl," "cycloalkyl," "substituted cycloalkyl," "heterocycloalkyl," "substituted heterocycloalkyl," "aryl," "substituted aryl," "heteroaryl," "substituted heteroaryl," "alkoxy," "silyl," "boryl," "phosphino," "phosphine," "amino," "amine," "thio," "seleno," and "saturated," "unsaturated" are as defined in WO 03/040201 which is incorporated by reference herein.

Ligands

Suitable ligands useful in the catalysts used in the practice of this invention can be characterized broadly as monoanionic ligands having an amine and a heteroaryl or substituted heteroaryl group. The ligands of the catalysts used in the practice of this invention are referred to, for the purposes of this invention, as nonmetallocene ligands, and may be characterized by the following general formula (1):

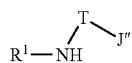

wherein $R^1$ is very generally selected from the group consisting of alkyl, substituted alkyl, cycloalkyl, substituted cycloalkyl, heteroalkyl, substituted heteroalkyl, heterocycloalkyl, substituted heterocycloalkyl, aryl, substituted aryl, heteroaryl, substituted heteroaryl and combinations thereof. In many embodiments, $R^1$ is a ring having from 4-8 atoms in the ring generally selected from the group consisting of substituted cycloalkyl, substituted heterocycloalkyl, substituted aryl and substituted heteroaryl, such that $R^1$ may be characterized by the general formula (2):

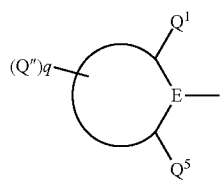

where $Q^1$ and $Q^5$ are substituents on the ring ortho to atom E, with E being selected from the group consisting of carbon and nitrogen and with at least one of $Q^1$ or $Q^5$ being bulky (defined as having at least 2 atoms). $Q^1$ and $Q^5$ are independently selected from the group consisting of alkyl, substituted alkyl, cycloalkyl, substituted cycloalkyl, aryl, substituted aryl and silyl, but provided that $Q^1$ and $Q^5$ are not both methyl. $Q''_q$ represents additional possible substituents on the ring, with q being 1, 2, 3, 4 or 5 and $Q''$ being selected from the group consisting of hydrogen, alkyl, substituted alkyl, cycloalkyl, substituted cycloalkyl, heteroalkyl, substituted heteroalkyl, heterocycloalkyl, substituted heterocycloalkyl, aryl, substituted aryl, heteroaryl, substituted heteroaryl, alkoxyl, aryloxyl, silyl, boryl, phosphino, amino, thio, seleno, halide, nitro, and combinations thereof. T is a bridging group selected group consisting of —$CR^2R^3$— and —$SiR^2R^3$— with $R^2$ and $R^3$ being independently selected from the group consisting of hydrogen, alkyl, substituted alkyl, cycloalkyl, substituted cycloalkyl, heteroalkyl, substituted heteroalkyl, heterocycloalkyl, substituted heterocycloalkyl, aryl, substituted aryl, heteroaryl, substituted heteroaryl, alkoxyl, aryloxyl, silyl, boryl, phosphino, amino, thio, seleno, halide, nitro, and combinations thereof. J" is generally selected from the group consisting of heteroaryl and substituted heteroaryl, with particular embodiments for particular reactions being described herein.

In a more specific embodiment, suitable nonmetallocene ligands useful in this invention may be characterized by the following general formula (4):

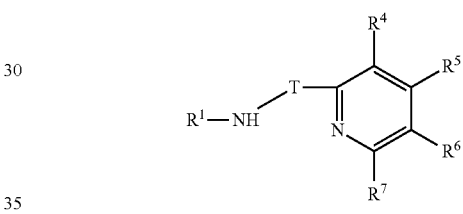

wherein $R^1$ and T are as defined above and each of $R^4$, $R^5$, $R^6$ and $R^7$ is independently selected from the group consisting of hydrogen, alkyl, substituted alkyl, cycloalkyl, substituted cycloalkyl, heteroalkyl, substituted heteroalkyl, heterocycloalkyl, substituted heterocycloalkyl, aryl, substituted aryl, heteroaryl, substituted heteroaryl, alkoxyl, aryloxyl, silyl, boryl, phosphino, amino, thio, seleno, halide, nitro, and combinations thereof. Optionally, any combination of $R^4$, $R^5$, $R^6$ and $R^7$ may be joined together in a ring structure.

In certain more specific embodiments, the ligands in this invention may be characterized by the following general formula (5):

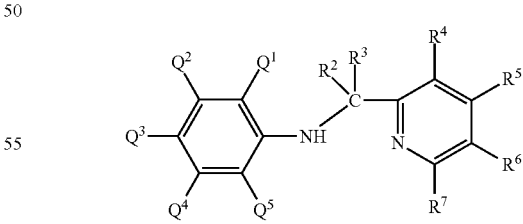

wherein $Q^1$, $Q^5$, $R^4$, $R^5$, $R^6$ and $R^7$ are as defined above. $Q^2$, $Q^3$, $Q^4$, $R^2$, and $R^3$ are independently selected from the group consisting of hydrogen, alkyl, substituted alkyl, cycloalkyl, substituted cycloalkyl, heteroalkyl, substituted heteroalkyl, heterocycloalkyl, substituted heterocycloalkyl, aryl, substituted aryl, heteroaryl, substituted heteroaryl, alkoxyl, aryloxyl, silyl, boryl, phosphino, amino, thio, seleno, nitro, and combinations thereof.

In other more specific embodiments, the ligands of this invention and suitable herein may be characterized by the following general formula (6):

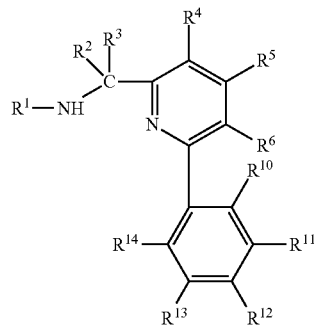

wherein $R^1$, $R^2$, $R^3$, $R^4$, $R^5$, and $R^6$ are as defined above. In this embodiment the $R^7$ substituent has been replaced with an aryl or substituted aryl group, with $R^{10}$, $R^{11}$, $R^{12}$ and $R^{13}$ being independently selected from the group consisting of hydrogen, halo, alkyl, substituted alkyl, cycloalkyl, substituted cycloalkyl, heteroalkyl, substituted heteroalkyl, heterocycloalkyl, substituted heterocycloalkyl, aryl, substituted aryl, heteroaryl, substituted heteroaryl, alkoxy, aryloxy, silyl, boryl, phosphino, amino, thio, seleno, nitro, and combinations thereof, optionally, two or more $R^{10}$, $R^{11}$, $R^{12}$ and $R^{13}$ groups may be joined to form a fused ring system having from 3-50 non-hydrogen atoms. $R^{14}$ is selected from the group consisting of hydrogen, alkyl, substituted alkyl, cycloalkyl, substituted cycloalkyl, heteroalkyl, substituted heteroalkyl, heterocycloalkyl, substituted heterocycloalkyl, aryl, substituted aryl, heteroaryl, substituted heteroaryl, alkoxy, aryloxy, silyl, boryl, phosphino, amino, thio, seleno, halide, nitro, and combinations thereof.

In still more specific embodiments, the ligands in this invention may be characterized by the general formula (7):

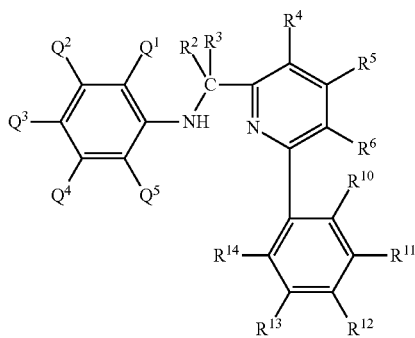

wherein $R^2$-$R^6$, $R^{10}$-$R^{14}$ and, $Q^1$-$Q^5$ are all as defined above.

In certain embodiments, $R^2$ is preferably hydrogen. Also preferably, each of $R^4$ and $R^5$ is hydrogen and $R^6$ is either hydrogen or is joined to $R^7$ to form a fused ring system. Also preferred is where $R^3$ is selected from the group consisting of benzyl, phenyl, 2-biphenyl, t-butyl, 2-dimethylaminophenyl (2-(NMe$_2$)—C$_6$H$_4$—) (where Me is methyl), 2-methoxyphenyl (2-MeO—C$_6$H$_4$—), anthracenyl, mesityl, 2-pyridyl, 3,5-dimethylphenyl, o-tolyl, 9-phenanthrenyl. Also preferred is where $R^1$ is selected from the group consisting of mesityl, 4 isopropylphenyl (4-Pr$^i$-C$_6$H$_4$—), napthyl, 3,5-(CF$_3$)$_2$—C$_6$H$_3$, 2-Me-napthyl, 2,6-(Pr$^i$)$_2$-C$_6$H$_3$—, 2-biphenyl, 2-Me-4-MeO—C$_6$H$_3$—; 2-Bu$^t$-C$_6$H$_4$—, 2,5-(Bu$^t$)$_2$—C$_6$H$_3$—, 2-Pr$^i$-6-Me-C$_6$H$_3$—; 2-Bu$^t$-6-Me-C$_6$H$_3$—, 2,6-Et$_2$-C$_6$H$_3$—, 2-sec-butyl-6-Et-C$_6$H$_3$—. Also preferred is where $R^7$ is selected from the group consisting of hydrogen, phenyl, napthyl, methyl, anthracenyl, 9-phenanthrenyl, mesityl, 3,5-(CF$_3$)$_2$—C$_6$H$_3$—, 2-CF$_3$—C$_6$H$_4$—, 4-CF$_3$—C$_6$H$_4$—, 3,5-F$_2$—C$_6$H$_3$—, 4-F—C$_6$H$_4$—, 2,4-F$_2$—C$_6$H$_3$—, 4-(NMe$_2$)—C$_6$H$_4$—, 3-MeO—C$_6$H$_4$—, 4-MeO—C$_6$H$_4$—, 3,5-Me$_2$-C$_6$H$_3$—, o-tolyl, 2,6-F$_2$—C$_6$H$_3$— or where $R^7$ is joined together with $R^6$ to form a fused ring system, e.g., quinoline.

Also optionally, two or more $R^4$, $R^5$, $R^6$, or $R^7$ groups may be joined to form a fused ring system having from 3-50 non-hydrogen atoms in addition to the pyridine ring, e.g. generating a quinoline group. In these embodiments, $R^3$ is selected from the group consisting of aryl, substituted aryl, heteroaryl, substituted heteroaryl, primary and secondary alkyl groups, and —PY$_2$ where Y is selected from the group consisting of aryl, substituted aryl, heteroaryl, and substituted heteroaryl.

Optionally within above formulas (6) and (7), $R^6$ and $R^{10}$ may be joined to form a ring system having from 5-50 non-hydrogen atoms. For example, if $R^6$ and $R^{10}$ together form a methylene, the ring will have 5 atoms in the backbone of the ring, which may or may not be substituted with other atoms. Also for example, if $R^6$ and $R^{10}$ together form an ethylene, the ring will have 6 atoms in the backbone of the ring, which may or may not be substituted with other atoms. Substituents from the ring can be selected from the group consisting of halo, alkyl, substituted alkyl, cycloalkyl, substituted cycloalkyl, heteroalkyl, substituted heteroalkyl, heterocycloalkyl, substituted heterocycloalkyl, aryl, substituted aryl, heteroaryl, substituted heteroaryl, alkoxy, aryloxy, silyl, boryl, phosphino, amino, thio, seleno, nitro, and combinations thereof.

In certain embodiments, the ligands are novel compounds and those of ordinary skill in the art will be able to identify such compounds from the above. One example of the novel ligand compounds, includes those compounds generally characterized by formula (5), above where $R^2$ is selected from the group consisting of hydrogen, alkyl, substituted alkyl, cycloalkyl, substituted cycloalkyl, aryl, and substituted aryl; and $R^3$ is a phosphino characterized by the formula —PZ$^1$Z$^2$, where each of $Z^1$ and $Z^2$ is independently selected from the group consisting of hydrogen, substituted or unsubstituted alkyl, cycloalkyl, heterocycloalkyl, heterocyclic, aryl, substituted aryl, heteroaryl, silyl, alkoxy, aryloxy, amino and combinations thereof. Particularly preferred embodiments of these compounds include those where $Z^1$ and $Z^2$ are each independently selected from the group consisting of alkyl, substituted alkyl, cycloalkyl, heterocycloalkyl, aryl, and substituted aryl; and more specifically phenyl; where $Q^1$, $Q^3$, and $Q^5$ are each selected from the group consisting of alkyl and substituted alkyl and each of $Q^2$ and $Q^4$ is hydrogen; and where $R^4$, $R^5$, $R^6$ and $R^7$ are each hydrogen. For more information on useful ligands please see WO 2006/38628.

The ligands of the catalysts of this invention may be prepared using known procedures. See, for example, Advanced Organic Chemistry, March, Wiley, New York 1992 (4.sup.th, Ed.). Specifically, the ligands of the invention may be prepared using the two step procedure outlined in Schemes 1 and as disclosed at pages 42 to 44 of WO 03/040201.

Compositions

Once the desired ligand is formed, it may be combined with a metal atom, ion, compound or other metal catalyst compound. In some applications, the ligands of this invention will be combined with a metal compound or catalyst and the product of such combination is not determined, if a product forms. For example, the ligand may be added to a reaction vessel at the same time as the metal or metal catalyst compound along with the reactants, activators, scavengers, etc. Additionally, the ligand can be modified prior to addition to or after the addition of the metal catalyst, e.g. through a deprotonation reaction or some other modification.

For the above formulae, the metal catalyst compounds may be characterized by the general formula $Hf(L)_n$ where L is independently selected from the group consisting of halide (F, Cl, Br, I), alkyl, substituted alkyl, cycloalkyl, substituted cycloalkyl, heteroalkyl, substituted heteroalkyl, heterocycloalkyl, substituted heterocycloalkyl, aryl, substituted aryl, heteroaryl, substituted heteroaryl, alkoxy, aryloxy, hydroxy, boryl, silyl, amino, amine, hydrido, allyl, diene, seleno, phosphino, phosphine, carboxylates, thio, 1,3-dionates, oxalates, carbonates, nitrates, sulphates, and combinations thereof n is 1, 2, 3, 4, 5, or 6. The hafnium catalysts may be monomeric, dimeric or higher orders thereof. It is well known that hafnium metal typically contains some amount of impurity of zirconium. Thus, this invention uses as pure hafnium as is commercially reasonable. Specific examples of suitable hafnium catalysts include, but are not limited to $HfCl_4$, $Hf(CH_2Ph)_4$, $Hf(CH_2CMe_3)_4$, $Hf(CH_2SiMe_3)_4$, $Hf(CH_2Ph)_3Cl$, $Hf(CH_2CMe_3)_3Cl$, $Hf(CH_2SiMe_3)_3Cl$, $Hf(CH_2Ph)_2Cl_2$, $Hf(CH_2CMe_3)_2Cl_2$, $Hf(CH_2SiMe_3)_2Cl_2$, $Hf(NMe_2)_4$, $Hf(NEt_2)_4$, and $Hf(N(SiMe_3)_2)_2Cl_2$. Lewis base adducts of these examples are also suitable as hafnium catalysts, for example, ethers, amines, thioethers, phosphines and the like are suitable as Lewis bases.

For formulae 5 and 6, the metal catalyst compounds may be characterized by the general formula $M(L)_n$ where M is hafnium or zirconium and each L is independently selected from the group consisting of halide (F, Cl, Br, I), alkyl, substituted alkyl, cycloalkyl, substituted cycloalkyl, heteroalkyl, substituted heteroalkyl, heterocycloalkyl, substituted heterocycloalkyl, aryl, substituted aryl, heteroaryl, substituted heteroaryl, alkoxy, aryloxy, hydroxy, boryl, silyl, amino, amine, hydrido, allyl, diene, seleno, phosphino, phosphine, carboxylates, thio, 1,3-dionates, oxalates, carbonates, nitrates, sulphates, and combinations thereof n is 4, typically. It is well known that hafnium metal typically contains some amount of impurity of zirconium. Thus, this invention uses as pure hafnium or zirconium as is commercially reasonable. Specific examples of suitable hafnium and zirconium catalysts include, but are not limited to $HfCl_4$, $Hf(CH_2Ph)_4$, $Hf(CH_2CMe_3)_4$, $Hf(CH_2SiMe_3)_4$, $Hf(CH_2Ph)_3Cl$, $Hf(CH_2CMe_3)_3Cl$, $Hf(CH_2SiMe_3)_3Cl$, $Hf(CH_2Ph)_2Cl_2$, $Hf(CH_2CMe_3)_2Cl_2$, $Hf(CH_2SiMe_3)_2Cl_2$, $Hf(NMe_2)_4$, $Hf(NEt_2)_4$, and $Hf(N(SiMe_3)_2)_2Cl_2$, $ZrCl_4$, $Zr(CH_2Ph)_4$, $Zr(CH_2CMe_3)_4$, $Zr(CH_2SiMe_3)_4$, $Zr(CH_2Ph)_3Cl$, $Zr(CH_2CMe_3)_3Cl$, $Zr(CH_2SiMe_3)_3Cl$, $Zr(CH_2Ph)_2Cl_2$, $Zr(CH_2CMe_3)_2Cl_2$, $Zr(CH_2SiMe_3)_2Cl_2$, $Zr(NMe_2)_4$, $Zr(NEt_2)_4$, and $Zr(N(SiMe_3)_2)_2Cl_2$.

Lewis base adducts of these examples are also suitable as hafnium catalysts, for example, ethers, amines, thioethers, phosphines and the like are suitable as Lewis bases.

The ligand to metal catalyst compound molar ratio is typically in the range of about 0.01:1 to about 100:1, more preferably in the range of about 0.1:1 to about 10:1.

Metal-Ligand Complexes

This invention, in part, relates to the use of nonmetallocene metal-ligand complexes. Generally, the ligand is mixed with a suitable metal catalyst compound prior to or simultaneously with allowing the mixture to be contacted with the reactants (e.g., monomers). When the ligand is mixed with the metal catalyst compound, a metal-ligand complex may be formed, which may be a catalyst or may need to be activated to be a catalyst. The metal-ligand complexes discussed herein are referred to as 2,1 complexes or 3,2 complexes, with the first number representing the number of coordinating atoms and second number representing the charge occupied on the metal. The 2,1-complexes therefore have two coordinating atoms and a single anionic charge. Other embodiments of this invention are those complexes that have a general 3,2 coordination scheme to a metal center, with 3,2 referring to a ligand that occupies three coordination sites on the metal and two of those sites being anionic and the remaining site being a neutral Lewis base type coordination.

Looking first at the 2,1-nonmetallocene metal-ligand complexes, the metal-ligand complexes may be characterized by the following general formula (8):

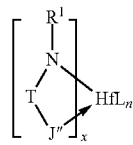

wherein T, J", $R^1$, L and n are as defined previously; and x is 1 or 2. The J" heteroaryl may or may not datively bond, but is drawn as bonding. More specifically, the nonmetallocene-ligand complexes may be characterized by the formula (9):

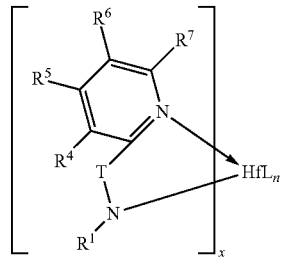

wherein $R^1$, T, $R^4$, $R^5$, $R^6$, $R^7$, L and n are as defined previously; and x is 1 or 2. In one preferred embodiment x=1 and n=3. Additionally, Lewis base adducts of these metal-ligand complexes are also within the scope of the invention, for example, ethers, amines, thioethers, phosphines and the like are suitable as Lewis bases.

More specifically, the nonmetallocene metal-ligand complexes of this invention may be characterized by the general formula (10):

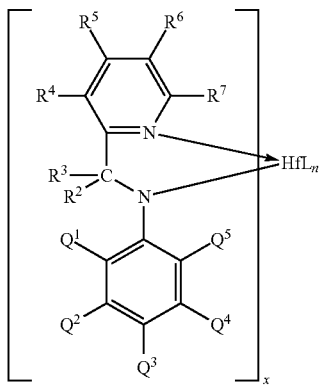

wherein the variables are generally defined above. Thus, e.g., $Q^2$, $Q^3$, $Q^4$, $R^2$, $R^3$, $R^4$, $R^5$, $R^6$ and $R^7$ are independently selected from the group consisting of hydrogen, alkyl, substituted alkyl, cycloalkyl, substituted cycloalkyl, heteroalkyl, substituted heteroalkyl, heterocycloalkyl, substituted heterocycloalkyl, aryl, substituted aryl, heteroaryl, substituted heteroaryl, alkoxyl, aryloxyl, silyl, boryl, phosphino, amino, thio, seleno, nitro, and combinations thereof, optionally, two or more $R^4$, $R^5$, $R^6$ and $R^7$ groups may be joined to form a fused ring system having from 3-50 non-hydrogen atoms in addition to the pyridine ring, e.g. generating a quinoline group; also, optionally, any combination of $R^2$, $R^3$, and $R^4$, may be joined together in a ring structure; $Q^1$ and $Q^5$ are selected from the group consisting of alkyl, substituted alkyl, cycloalkyl, substituted cycloalkyl, aryl, substituted aryl, provided that $Q^1$ and $Q^5$ are not both methyl; and each L is independently selected from the group consisting of halide, alkyl, substituted alkyl, cycloalkyl, substituted cycloalkyl, heteroalkyl, substituted heteroalkyl, heterocycloalkyl, substituted heterocycloalkyl, aryl, substituted aryl, heteroaryl, substituted heteroaryl, alkoxy, aryloxy, hydroxy, boryl, silyl, amino, amine, hydrido, allyl, diene, seleno, phosphino, phosphine, carboxylates, thio, 1,3-dionates, oxalates, carbonates, nitrates, sulphates and combinations thereof; n is 1, 2, 3, 4, 5, or 6; and x=1 or 2.

In other embodiments, the 2,1 metal-ligand complexes can be characterized by the general formula (11):

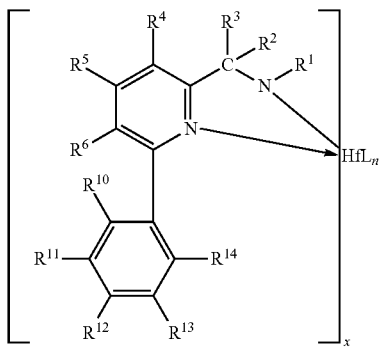

wherein the variables are generally defined above.

In still other embodiments, the 2,1 metal-ligand complexes of this invention can be characterized by the general formula (12):

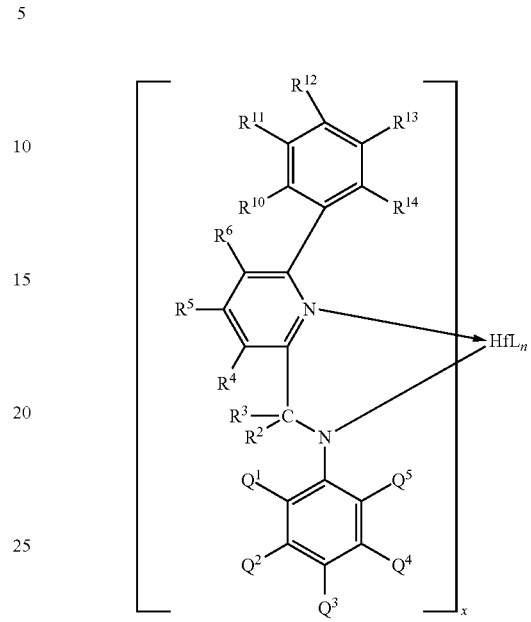

wherein the variables are generally defined above.

In a particularly preferred embodiment the nonmetallocene metal-ligand complexes are represented by the formulae at page 50-51 of WO 03/040201.

Turning to the 3,2 metal-ligand nonmetallocene complexes used in the practice of this invention, the metal-ligand complexes may be characterized by the general formula (13):

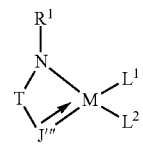

where M is zirconium or hafnium; $R^1$ and T are defined above; J''' being selected from the group of substituted heteroaryls with 2 atoms bonded to the metal M, at least one of those 2 atoms being a heteroatom, and with one atom of J''' is bonded to M via a dative bond, the other through a covalent bond; and $L^1$ and $L^2$ are independently selected from the group consisting of halide, alkyl, substituted alkyl, cycloalkyl, substituted cycloalkyl, heteroalkyl, substituted heteroalkyl, heterocycloalkyl, substituted heterocycloalkyl, aryl, substituted aryl, heteroaryl, substituted heteroaryl, alkoxy, aryloxy, hydroxy, boryl, silyl, amino, amine, hydrido, allyl, diene, seleno, phosphino, phosphine, carboxylates, thio, 1,3-dionates, oxalates, carbonates, nitrates, sulphates, and combinations thereof.

More specifically, the 3,2 metal-ligand nonmetallocene complexes of this invention may be characterized by the general formula (14):

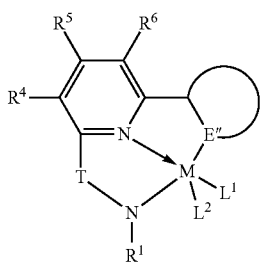

where M is zirconium or hafnium; T, $R^1$, $R^4$, $R^5$, $R^6$, $L^1$ and $L^2$ are defined above; and E" is either carbon or nitrogen and is part of an cyclic aryl, substituted aryl, heteroaryl, or substituted heteroaryl group.

Even more specifically, the 3,2 metal-ligand nonmetallocene complexes used in the practice of this invention may be characterized by the general formula (15):

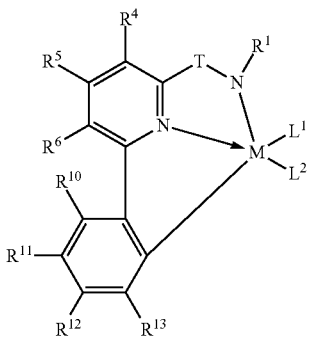

where M is zirconium or hafnium; and T, $R^1$, $R^4$, $R^5$, $R^6$, $R^{10}$, $R^{11}$, $R^{12}$, $R^{13}$, $L^1$ and $L^2$ are defined above.

Still even more specifically, the 3,2 metal-ligand nonmetallocene complexes of this invention may be characterized by the general formula (16):

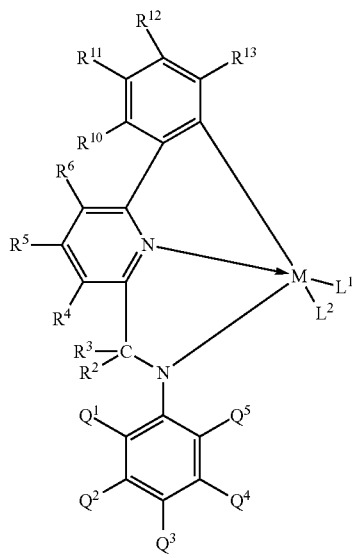

where M is zirconium or hafnium; and $R^2$, $R^3$, $R^4$, $R^5$, $R^6$, $R^{10}$, $R^{11}$, $R^{12}$, $R^{13}$, $Q^1$, $Q^2$, $Q^3$, $Q^4$, $Q^5$, $L^1$ and $L^2$ are defined above.

In the above formulas, $R^{10}$, $R^{11}$, $R^{12}$, and $R^{13}$ are independently selected from the group consisting of hydrogen, halo, alkyl, substituted alkyl, cycloalkyl, substituted cycloalkyl, heteroalkyl, substituted heteroalkyl, heterocycloalkyl, substituted heterocycloalkyl, aryl, substituted aryl, heteroaryl, substituted heteroaryl, alkoxy, aryloxy, silyl, boryl, phosphino, amino, thio, seleno, nitro, and combinations thereof; optionally, two or more $R^{10}$, $R^{11}$, $R^{12}$, and $R^{13}$ groups may be joined to form a fused ring system having from 3-50 non-hydrogen atoms.

In addition, Lewis base adducts of the metal-ligand complexes in the above formulas are also suitable, for example, ethers, amines, thioethers, phosphines and the like are suitable as Lewis bases.

The metal-ligand complexes can be formed by techniques known to those of skill in the art. In some embodiments, $R^{14}$ is hydrogen and the metal-ligand complexes are formed by a metallation reaction (in situ or not) as shown in the reaction scheme on page 54-55 of WO 03/040201. Specific examples of 3,2 complexes of this invention include all those listed in WO 03/040201.

The ligands, complexes or catalysts may be supported on an organic or inorganic support. Suitable supports include silicas, aluminas, clays, zeolites, magnesium chloride, polyethyleneglycols, polystyrenes, polyesters, polyamides, peptides and the like. Polymeric supports may be cross-linked or not. Similarly, the ligands, complexes or catalysts may be supported on similar supports known to those of skill in the art. In addition, the catalysts of this invention may be combined with other catalysts in a single reactor and/or employed in a series of reactors (parallel or serial) in order to form blends of polymer products.

The metal complexes used in this invention are rendered catalytically active by combination with an activating cocatalyst or by use of an activating technique. Suitable activating cocatalysts for use herein include neutral Lewis acids such as alumoxane (modified and unmodified), C1-C30 hydrocarbyl substituted Group 13 compounds, especially tri(hydrocarbyl)aluminum- or tri(hydrocarbyl)boron compounds and halogenated (including perhalogenated) derivatives thereof, having from 1 to 10 carbons in each hydrocarbyl or halogenated hydrocarbyl group, more especially perfluorinated tri(aryl)boron compounds, and most especially tris(pentafluorophenyl)borane; nonpolymeric, compatible, noncoordinating, ion forming compounds (including the use of such compounds under oxidizing conditions), especially the use of ammonium-, phosphonium-, oxonium-, carbonium-, silylium- or sulfonium-salts of compatible, noncoordinating anions, or ferrocenium salts of compatible, noncoordinating anions; bulk electrolysis (explained in more detail hereinafter); and combinations of the foregoing activating cocatalysts and techniques. The foregoing activating cocatalysts and activating techniques have been previously taught with respect to different metal complexes in the following references: U.S. Pat. No. 5,153,157 and U.S. Pat. No. 5,064,802, EP-A-277, 003, EP-A-468,651 (equivalent to U.S. Ser. No. 07/547,718, now abandoned), U.S. Pat. No. 5,721,185 and U.S. Pat. No. 5,350,723.

The alumoxane used as an activating cocatalyst in this invention is of the formula $(R^4_x(CH_3)_y AlO_n)$, in which $R^4$ is a linear, branched or cyclic C1 to C6 hydrocarbyl, x is from 0 to about 1, y is from about 1 to 0, and n is an integer from about 3 to about 25, inclusive. The preferred alumoxane components, referred to as modified methylalumoxanes, are those wherein $R^4$ is a linear, branched or cyclic C3 to C9 hydrocarbyl, x is from about 0.15 to about 0.50, y is from about 0.85 to about 0.5 and n is an integer between 4 and 20, inclusive; still more preferably, $R^4$ is isobutyl, tertiary butyl or n-octyl, x is from about 0.2 to about 0.4, y is from about 0.8 to about 0.6 and n is an integer between 4 and 15, inclusive. Mixtures of the above alumoxanes may also be employed in the practice of the invention.

Most preferably, the alumoxane is of the formula $(R^4{}_x (CH_3)_y AlO)_n$, wherein $R^4$ is isobutyl or tertiary butyl, x is about 0.25, y is about 0.75 and n is from about 6 to about 8.

Particularly useful alumoxanes are so-called modified alumoxanes, preferably modified methylalumoxanes (MMAO), that are completely soluble in alkane solvents, for example heptane, and may include very little, if any, trialkylaluminum. A technique for preparing such modified alumoxanes is disclosed in U.S. Pat. No. 5,041,584 (which is incorporated by reference). Alumoxanes useful as an activating cocatalyst in this invention may also be made as disclosed in U.S. Pat. Nos. 4,542,199; 4,544,762; 4,960,878; 5,015,749; 5,041,583 and 5,041,585. Various alumoxanes can be obtained from commercial sources, for example, Akzo-Nobel Corporation, and include MMAO-3A, MMAO-12, and PMAO-IP.

Combinations of neutral Lewis acids, especially the combination of a trialkyl aluminum compound having from 1 to 4 carbons in each alkyl group and a halogenated tri(hydrocarbyl)boron compound having from 1 to 10 carbons in each hydrocarbyl group, especially tris(pentafluorophenyl)borane, and combinations of neutral Lewis acids, especially tris(pentafluorophenyl)borane, with nonpolymeric, compatible noncoordinating ion-forming compounds are also useful activating cocatalysts.

Suitable ion forming compounds useful as cocatalysts in one embodiment of the present invention comprise a cation which is a Bronsted acid capable of donating a proton, and a compatible, noncoordinating anion, K. As used herein, the term "noncoordinating" means an anion or substance which either does not coordinate to the Group 4 metal containing catalyst complex and the catalytic derivative derived therefrom, or which is only weakly coordinated to such complexes thereby remaining sufficiently labile to be displaced by a neutral Lewis base. A noncoordinating anion specifically refers to an anion which when functioning as a charge balancing anion in a cationic metal complex does not transfer an anionic substituent or fragment thereof to said cation thereby forming neutral complexes. "Compatible anions" are anions which are not degraded to neutrality when the initially formed complex decomposes and are noninterfering with desired subsequent polymerization or other uses of the complex.

Preferred anions are those containing a single coordination complex comprising a charge-bearing metal or metalloid core which anion is capable of balancing the charge of the active catalyst species (the metal cation) which may be formed when the two components are combined. Also, said anion should be sufficiently labile to be displaced by olefinic, diolefinic and acetylenically unsaturated compounds or other neutral Lewis bases such as ethers or nitriles. Suitable metals include, but are not limited to, aluminum, gold and platinum. Suitable metalloids include, but are not limited to, boron, phosphorus, and silicon. Compounds containing anions which comprise coordination complexes containing a single metal or metalloid atom are, of course, well known and many, particularly such compounds containing a single boron atom in the anion portion, are available commercially.

In one embodiment of this invention, the activating cocatalysts may be represented by the following general formula: $[L^*\text{-}H]^+{}_d [A^{d-}]$ wherein: $L^*$ is a neutral Lewis base; $[L^*\text{-}H]^+$ is a Bronsted acid; $A^{d-}$ is a noncoordinating, compatible anion having a charge of d−; and d is an integer from 1 to 3. More preferably $A^{d-}$ corresponds to the formula: $[M^{k+}Q_{n'}]^{d-}$ wherein: k is an integer from 1 to 3; n' is an integer from 2 to 6; n'−k=d; M' is an element selected from Group 13 of the Periodic Table of the Elements; and each Q is independently selected from hydride, dialkylamido, halide, hydrocarbyl, hydrocarbyloxy, halosubstituted-hydrocarbyl, halosubstituted hydrocarbyloxy, and halo substituted silylhydrocarbyl radicals (including perhalogenated hydrocarbyl-perhalogenated hydrocarbyloxy- and perhalogenated silylhydrocarbyl radicals), said Q having up to 20 carbons with the proviso that in not more than one occurrence is Q halide. Examples of suitable hydrocarbyloxide Q groups are disclosed in U.S. Pat. No. 5,296,433.

In a more preferred embodiment, d is one, i.e., the counter ion has a single negative charge and is $A^−$. Activating cocatalysts comprising boron which are particularly useful in the preparation of catalysts of this invention may be represented by the following general formula: $[L^*\text{-}H]^+[BQ_4]^−$ wherein: $[L^*\text{-}H]^+$ is as previously defined; B is boron in an oxidation state of 3; and Q is a hydrocarbyl-, hydrocarbyloxy-, fluorinated hydrocarbyl-, fluorinated hydrocarbyloxy- or fluorinated silylhydrocarbyl-group of up to 20 nonhydrogen atoms, with the proviso that in not more than one occasion is Q hydrocarbyl. Most preferably, Q is each occurrence a fluorinated aryl group, especially, a pentafluorophenyl group.

Preferred $[L^*\text{-}H]^+$ cations include N,N-dimethylanilinium and tributylammonium. Another suitable ion forming, activating cocatalyst comprises a salt of a cationic oxidizing agent and a noncoordinating, compatible anion represented by the formula: $(Ox.^{e+})_d(A^{d-})_e$ wherein: $Ox.^{e+}$ is a cationic oxidizing agent having a charge of e+; e is an integer from 1 to 3; and $A^{d-}$ and d are as previously defined.

Examples of cationic oxidizing agents include: ferrocenium, hydrocarbyl-substituted ferrocenium, $Ag^+$, or $Pb^{+2}$. Preferred embodiments of $A^{d-}$ are those anions previously defined with respect to the Bronsted acid containing activating cocatalysts, especially tetrakis(pentafluorophenyl)borate.

Another suitable ion forming, activating cocatalyst comprises a compound which is a salt of a carbenium ion and a noncoordinating, compatible anion represented by the formula: $[C]^+A^−$ wherein: $[C]^+$ is a $C_1$-$C_{20}$ carbenium ion; and $A^−$ is as previously defined. A preferred carbenium ion is the trityl cation, i.e., triphenylmethylium.

A further suitable ion forming, activating cocatalyst comprises a compound which is a salt of a silylium ion and a noncoordinating, compatible anion represented by the formula: $R_3Si(X')_q{}^+A^−$ wherein: R is C1-C10 hydrocarbyl, and X', q and $A^−$ are as previously defined.

Preferred silylium salt activating cocatalysts are trimethylsilylium tetrakis(pentafluorophenyl)borate, triethylsilylium(tetrakispentafluoro)phenylborate and ether substituted adducts thereof. Silylium salts have been previously generically disclosed in J. Chem Soc. Chem. Comm., 1993, 383-384, as well as Lambert, J. B., et al., Organometallics, 1994, 13, 2430-2443.

Certain complexes of alcohols, mercaptans, silanols, and oximes with tris(pentafluorophenyl)borane are also effective catalyst activators and may be used according to the present invention. Such cocatalysts are disclosed in U.S. Pat. No. 5,296,433.

The molar ratio of catalyst/cocatalyst employed preferably ranges from 1:10,000 to 100:1, more preferably from 1:5000 to 10:1, most preferably from 1:100 to 1:1. In one embodiment of the invention the cocatalyst can be used in combination with a tri(hydrocarbyl)aluminum compound having from 1 to 10 carbons in each hydrocarbyl group. Mixtures of activating cocatalysts may also be employed. It is possible to employ these aluminum compounds for their beneficial ability to scavenge impurities such as oxygen, water, and aldehydes from the polymerization mixture. Preferred aluminum compounds include trialkyl aluminum compounds having from 1 to 6 carbons in each alkyl group, especially those wherein the alkyl groups are methyl, ethyl, propyl, isopropyl, n-butyl, isobutyl, pentyl, neopentyl or isopentyl. The molar ratio of metal complex to aluminum compound is preferably from 1:10,000 to 100:1, more preferably from 1:1000 to 10:1, preferably from 1:500 to 1:1, alternately from 200:1 to 1:1, alternately from 50:1 to 1:1. A most preferred borane activating cocatalyst comprises a strong Lewis acid, especially tris (pentafluorophenyl)borane.

In some embodiments disclosed herein, two or more different catalysts, including the use of mixed catalysts can be employed. In addition to a nonmetallocene, metal-centered, heteroaryl ligand catalyst, when a plurality of catalysts are used, any catalyst which is capable of copolymerizing one or more olefin monomers to make an interpolymer or homopolymer may be used in embodiments of the invention in conjunction with a nonmetallocene, metal-centered, heteroaryl ligand catalyst. For certain embodiments, additional selection criteria, such as molecular weight capability and/or comonomer incorporation capability, preferably should be satisfied. Two or more nonmetallocene, metal-centered, heteroaryl ligand catalysts having different substituents can be used in the practice of certain of the embodiments disclosed herein. Suitable catalysts which may be used in conjunction with the nonmetallocene, metal-centered, heteroaryl ligand catalysts disclosed herein include, but are not limited to, metallocene catalysts and constrained geometry catalysts, multi-site catalysts (Ziegler-Natta catalysts), and variations therefrom.

One suitable class of catalysts is the catalysts disclosed in U.S. Pat. No. 5,064,802, U.S. Pat. No. 5,132,380, U.S. Pat. No. 5,703,187, U.S. Pat. No. 6,034,021, EP 0 468 651, EP 0 514 828, WO 93/19104, and WO 95/00526. Another suitable class of catalysts is the metallocene catalysts disclosed in U.S. Pat. No. 5,044,438; U.S. Pat. No. 5,057,475; U.S. Pat. No. 5,096,867; and U.S. Pat. No. 5,324,800. It is noted that these catalysts may be considered as metallocene catalysts, and both are sometimes referred to in the art as single-site catalysts.

Another suitable class of catalysts is substituted indenyl containing metal complexes as disclosed in U.S. Pat. No. 5,965,756 and U.S. Pat. No. 6,015,868. Other catalysts are disclosed in copending applications: U.S. application Ser. No. 09/230,185, now U.S. Pat. No. 6,268,444; and Ser. No. 09/715,380, now U.S. Pat. No. 6,515,155 and U.S. Provisional Application Ser. No. 60/215,456; No. 60/170,175, and No. 60/393,862. The disclosures of all of the preceding patent applications are incorporated by reference herein in their entirety. These catalysts tend to have a higher molecular weight capability.

Other catalysts, cocatalysts, catalyst systems, and activating techniques which may be used in the practice of the invention disclosed herein may include WO 96/23010, published on Aug. 1, 1996; WO 99/14250, published Mar. 25, 1999; WO 98/41529, published Sep. 24, 1998; WO 97/42241, published Nov. 13, 1997; Scollard, et al., in J. Am. Chem. Soc 1996, 118, 10008-10009; EP 0 468 537 B1, published Nov. 13, 1996; WO 97/22635, published Jun. 26, 1997; EP 0 949 278 A2, published Oct. 13, 1999; EP 0 949 279 A2, published Oct. 13, 1999; EP 1 063 244 A2, published Dec. 27, 2000; U.S. Pat. No. 5,408,017; U.S. Pat. No. 5,767,208; U.S. Pat. No. 5,907,021; WO 88/05792, published Aug. 11, 1988; WO88/05793, published Aug. 11, 1988; WO 93/25590, published Dec. 23, 1993; U.S. Pat. No. 5,599,761; U.S. Pat. No. 5,218,071; WO 90/07526, published Jul. 12, 1990; U.S. Pat. No. 5,972,822; U.S. Pat. No. 6,074,977; U.S. Pat. No. 6,013, 819; U.S. Pat. No. 5,296,433; U.S. Pat. No. 4,874,880; U.S. Pat. No. 5,198,401; U.S. Pat. No. 5,621,127; U.S. Pat. No. 5,703,257; U.S. Pat. No. 5,728,855; U.S. Pat. No. 5,731,253; U.S. Pat. No. 5,710,224; U.S. Pat. No. 5,883,204; U.S. Pat. No. 5,504,049; U.S. Pat. No. 5,962,714; U.S. Pat. No. 5,965, 677; U.S. Pat. No. 5,427,991; WO 93/21238, published Oct. 28, 1993; WO 94/03506, published Feb. 17, 1994; WO 93/21242, published Oct. 28, 1993; WO 94/00500, published Jan. 6, 1994; WO 96/00244, published Jan. 4, 1996; WO 98/50392, published Nov. 12, 1998; WO 02/38628, published May 16, 2002; Wang, et al., Organometallics 1998, 17, 3149-3151; Younkin, et al., Science 2000, 287, 460-462; those disclosed by Chen and Marks, Chem. Rev. 2000, 100, 1391-1434; those disclosed by Alt and Koppl, Chem. Rev. 2000, 100, 1205-1221; those disclosed by Resconi, et al., Chem. Rev. 2000, 100, 1253-1345; those disclosed by Ittel, et al., Chem. Rev. 2000, 100, 1169-1203; those disclosed by Coates, Chem. Rev., 2000, 100, 1223-1251; those disclosed by Brady, III, et al., U.S. Pat. No. 5,093,415, those disclosed by Murray, et al., U.S. Pat. No. 6,303,719, those disclosed by Saito, et al., U.S. Pat. No. 5,874,505; and WO 96/13530, published May 9, 1996. Also useful are those catalysts, cocatalysts, and catalyst systems disclosed in U.S. Ser. No. 09/230,185, filed Jan. 15, 1999, now U.S. Pat. No. 6,268,444; U.S. Pat. No. 5,965,756; U.S. Pat. No. 6,150,297; U.S. Ser. No. 09/715,380, filed Nov. 17, 2000, now U.S. Pat. No. 6,515, 155. The disclosures of all of the preceding patents and or patent applications are incorporated by reference herein in their entirety to the extent they are not inconsistent with this specification.

In a preferred embodiment the polymerization system comprises less than 5 weight % polar species, preferably less than 4 wt %, more preferably less than 3 wt %, more preferably less than 2 wt %, more preferably less than 1 wt %, more preferably less than 1000 wt ppm, more preferably less than 750 ppm, more preferably less than 500 ppm, more preferably less than 250 ppm, more preferably less than 100 ppm, more preferably less than 50 ppm, more preferably less than 10 ppm. Polar species include oxygen containing compounds (except for alumoxanes) such as alcohols, oxygen, ketones, aldehydes, acids, esters and ethers.

In another embodiment the polymerization system comprises less than 5 wt % trimethylaluminum and/or triethylaluminum, preferably less than 4 wt %, more preferably less than 3 wt %, more preferably less than 2 wt %, more preferably less than 1 wt %, more preferably less than 1000 ppm, more preferably less than 750 ppm, more preferably less than 500 ppm, more preferably less than 250 ppm, more preferably less than 100 ppm, more preferably less than 50 ppm, more preferably less than 10 ppm.

In another preferred embodiment the polymerization system comprises methylalumoxane and less than 5 wt % trimethylaluminum and or triethylaluminum, preferably less than 4 wt %, more preferably less than 3 wt %, more preferably less than 2 wt %, more preferably less than 1 wt %, more preferably less than 1000 ppm, more preferably less than 750 ppm, more preferably less than 500 ppm, more preferably less than 250 ppm, more preferably less than 100 ppm, more preferably less than 50 ppm, more preferably less than 10 ppm.

Polymerization Process

This invention relates to processes to polymerize olefins comprising contacting one or more olefins having at least three carbon atoms with a catalyst compound and an activator in a catalyst system comprising one or two fluid phases in a reactor. In the preferred embodiment, the fluid reaction medium is in its liquid state and forms a single liquid phase. One or more reactors in series or in parallel may be used in the present invention. Catalyst compounds and activators may be delivered as a solution or slurry, either separately to the reactor, activated in-line just prior to the reactor, or preactivated and pumped as an activated solution or slurry to the reactor. A preferred operation is two solutions activated in-line. Polymerizations are carried out in either single reactor operation, in which monomer, comonomers, catalyst/activator, scavenger, and optional modifiers are added continuously to a single reactor or in more than one reactor connected in series or in parallel. If the reactors are connected in a series cascade, the catalyst components can be added to the first reactor in the series. The catalyst components may also be added to more than one reactor in a reactor cascade (such as a series reactor cascade), with one component being added to first reaction and other components to other downstream reactors, or additional catalyst (same or different) being added in downstream reactors.

A series reactor cascade has two or more reactors connected in series, in which the effluent of an upstream reactor is fed to the next reactor downstream in the reactor cascade. Besides the effluent of the upstream reactor(s), the feed of any reactor can be augmented with any combination of additional monomer, catalyst, scavenger, or solvent fresh or recycled feed streams. In a parallel reactor configuration, the reactor or reactors in series cascade that form a branch of the parallel reactor configuration is referred to as a reactor train.

The polymerization processes described herein operate well in tubular reactors and in autoclaves (also called stirred tank reactors). Autoclave reactors can be operated in batch or in continuous mode. To provide better productivity, and thus to lower production cost, continuous operation is preferred in commercial operations. Tubular reactors preferably operate in continuous mode. Typically, autoclave reactors have length-to-diameter ratios of 1:1 to 20:1 (preferably 4:1 to 20:1) and are typically fitted with a high-speed (up to 2000 RPM) multiblade stirrer. When the autoclave has a low length-to-diameter ratio (such as less than four) the feed streams are typically injected at only one position along the length of the reactor. Reactors with large diameters may have multiple injection ports at nearly the same position along the length of the reactor but radially distributed to allow for faster intermixing of the feed components with the reactor content. In the case of stirred tank reactors, the separate introduction of the catalyst is possible and often preferred. Such introduction prevents the possible formation of hot spots in the unstirred feed zone between the mixing point and the stirred zone of the reactor. Injections at two or more positions along the length of the reactor is also possible and sometimes preferred. For instance, in reactors where the length-to-diameter ratio is around 4:1 to 20:1, the reactor preferably can contain up to six different injection positions. Additionally, in the larger autoclaves, one or more lateral fixing devices support the high-speed stirrer. These fixing devices can also divide the autoclave into two or more zones. Mixing blades on the stirrer can differ from zone to zone to allow for a different degree of plug flow and back mixing, largely independently, in the separate zones. Two or more autoclaves with one or more zones can connect in series cascade to increase residence time or to tailor polymer structure. As mentioned above, a series reactor cascade typically has two or more reactors connected in series, in which the effluent of at least one upstream reactor is fed to the next reactor downstream in the cascade. Besides the effluent of the upstream reactor(s), the feed of any reactor in the series cascade can be augmented with any combination of additional monomer, catalyst, or solvent fresh or recycled feed streams. Two or more reactors can also be arranged in a parallel configuration. The individual arms of such parallel arrangements are referred to as reactor trains. These reactor trains in turn may themselves comprise one reactor or a reactor series cascade creating a combination of series and parallel reactors.

Tubular reactors may also be used in the process disclosed herein. Tubular reactors are fitted with external cooling and one or more injection points along the (tubular) reaction zone. As in autoclaves, these injection points serve as entry points for monomers (such as propylene), one or more comonomer, catalyst, or mixtures of these. In tubular reactors, external cooling often allows for increased monomer conversion relative to an autoclave, where the low surface-to-volume ratio hinders any significant heat removal. Tubular reactors have a special outlet valve that can send a pressure shockwave backward along the tube. The shockwave helps dislodge any polymer residue that has formed on reactor walls during operation. Alternately, tubular reactors may be fabricated with smooth, unpolished internal surfaces to address wall deposits. Tubular reactors generally may operate at pressures of up to 360 MPa, may have lengths of 100-2000 meters or 100-4000 meters, and may have internal diameters of less than 12.5 cm (alternately less than 10 cm). Typically, tubular reactors have length-to-diameter ratios of 10:1 to 50,000:1 and may include up to 10 different injection positions along its length, (preferably from one to ten different injection positions, alternately from one to six different injection positions).

Reactor trains that pair autoclaves with tubular reactors can also serve in invention processes. In such instances, the autoclave typically precedes the tubular reactor or the two types of reactors form separate trains of a parallel reactor configuration. Such systems may have injection of additional catalyst and/or feed components at several points in the autoclave and more particularly along the tube length.

In both autoclaves and tubular reactors, at injection, feeds are preferably cooled to near ambient temperature or below to provide maximum cooling and thus maximum polymer production within the limits of maximum operating temperature. In autoclave operation, a preheater operates at startup, but not necessarily after the reaction reaches steady state if the first mixing zone has some back-mixing characteristics. In tubular reactors, the first section of double-jacketed tubing is heated rather than cooled and is operated continuously. A useful tubular reactor is characterized by plug flow. By plug flow, is meant a flow pattern with minimal radial flow rate differences. In both multizone autoclaves and tubular reactors, catalyst can be injected not only at the inlet, but also optionally at one or more points along the reactor. The catalyst feeds injected at the inlet and other injection points can be the same or different in terms of content, density, concentration, etc. Choosing different catalyst feeds allows polymer design tailoring. At the reactor outlet valve, the pressure drops to levels below that which critical phase separation occurs. Therefore, a downstream separation vessel may contain a polymer-rich phase and a polymer-lean phase. Typically, conditions in this vessel remain supercritical and temperature remains above the polymer product's crystallization temperature. The autoclave or tubular reactor effluent is depressurized on entering the high pressure separator (HPS).

In any of the multi-reactor systems described herein only one reactor need contain the non-metallocene metal centered, heteroaryl ligand catalyst compound described herein. Any of the other reactors may contain any other polymerization catalyst such as Ziegler-Natta polymerization catalysts, metallocene catalysts, Phillips type catalysts or the like. Useful other catalysts are described at WO 2004/026921 at page 21 paragraph [0081] to page 72, paragraph A preferred catalyst for use in any of the reactors is a chiral metallocene catalyst compound used in combination with an activator. In a preferred embodiment both the non-metallocene metal centered, heteroaryl ligand catalyst compound and a chiral metallocene compound are used. In another embodiment the non-metallocene metal centered, heteroaryl ligand catalyst compound and a chiral metallocene compound are used in series reactors or parallel reactors. Particularly useful metallocene compounds include $Me_2Si$-bis(2-R, 4-Phl-indenyl)$MX_2$, where R is an alkyl group (such as methyl), Phl is phenyl or substituted phenyl, M is Hf, Zr or Ti, and X is a halogen or alkyl group (such as Cl or methyl). Particularly useful metallocene compounds include: 2-dimethylsilyl-bis(2-methyl, 4-phenyl-indenyl)zirconium dimethyl, and 2-dimethylsilyl-bis(2-methyl, 4-phenyl-indenyl) zirconium dichloride.

At the reactor outlet valve, the pressure drops to begin the separation of polymer and unreacted monomer, co-monomers, inerts, like ethane, propane, solvents, like hexanes, toluene, etc. The temperature in this vessel will be maintained above the polymer product's crystallization point but the pressure may be below the critical point. The pressure need only be high enough that the monomer, for example propylene, can be condensed against standard cooling water. The liquid recycle stream can then be recycled to the reactor with a liquid pumping system instead of the hyper-compressors required for polyethylene units. The relatively low pressure in this separator will reduce the monomer concentration in the liquid polymer phase which will result in a much lower polymerization rate. This polymerization rate in some embodiments may be low enough to operate this system without adding a catalyst poison or "killer". If a catalyst killer is required (e.g., to prevent reactions in the high pressure recycle) then provision must be made to remove any potential catalyst poisons from the recycled propylene rich monomer stream e.g. by the use of fixed bed adsorbents or by scavenging with an aluminum alkyl.

Alternately, the HPS may be operated over the critical pressure of the monomer or monomer blend but within the monomer/polymer two-phase region. This is the economically preferred method if the polymer is to be produced with a revamped high-pressure polyethylene (HPPE) plant. The recycled HPS overhead is cooled and dewaxed before being returned to the suction of the secondary compressor.

The polymer from this intermediate or high pressure vessel will then go through another pressure reduction step to a low pressure separator. The temperature of this vessel will be maintained above the polymer melting point so that the polymer from this vessel can be fed as a liquid directly to an extruder or static mixer. The pressure in this vessel will be kept low by using a compressor to recover the unreacted monomers, etc to the condenser and pumping system referenced above.

In addition to autoclave reactors, tubular reactors, or a combination of these reactors, loop-type reactors may be utilized in the process disclosed herein. In this reactor type, monomer enters and polymer exits continuously at different points along the loop, while an in-line pump continuously circulates the contents (reaction liquid). The feed/product takeoff rates control the total average residence time. A cooling jacket removes reaction heat from the loop. Typically feed inlet temperatures are near to or below ambient temperatures to provide cooling to the exothermic reaction in the reactor operating above the crystallization temperature of the polymer product. The loop reactor may have a diameter of 41 to 61 cm and a length of 100 to 200 meters and may operate at pressures of 25 to 30 MPa. In addition, an in-line pump may continuously circulate the polymerization system through the loop reactor. Alternately the loop reactor is operated at pressures of 1.5 to 30 MPa.

U.S. Pat. No. 6,355,741 discusses a reactor with at least two loops that is useful in the practice of this invention provided that one or both loops operate at the supercritical conditions. U.S. Pat. No. 5,326,835 describes a process said to produce polymer in a bimodal fashion. This process's first reactor stage is a loop reactor in which polymerization occurs in an inert, low-boiling hydrocarbon. After the loop reactor, the reaction medium transits into a gas-phase reactor where gas-phase polymerization occurs. Since two very different environments create the polymer, it shows a bimodal molecular weight distribution. This two stage procedure can be modified to work with the procedure of the instant invention. For instance, a first stage loop reactor can use propylene as the monomer and a propylene-based reaction medium instead of the inert low-boiling hydrocarbon.

PCT publication WO 19/14766 describes a process comprising the steps of (a) continuously feeding olefinic monomer and a catalyst system, with a metallocene component and a cocatalyst component, to the reactor; (b) continuously polymerizing that monomer in a polymerization zone reactor under elevated pressure; (c) continuously removing the polymer/monomer mixture from the reactor; (d) continuously separating monomer from molten polymer; (e) reducing pressure to form a monomer-rich and a polymer-rich phase; and (f) separating monomer from the reactor. The polymerization zoning technique described in the above process can be practiced using the instant invention's process conditions.

The polymerization processes disclosed herein may have residence times in the reactors as short as 0.5 seconds and as long as several hours, alternately from 1 sec to 120 min, alternately from 1 minute to 60 minutes, alternately from 5 minutes to 30 minutes. In an alternate embodiment, when operated in one or more reactors, the residence time in any one reactor (alternately in all reactors total) is less than 30 minutes, preferably less than 20 minutes, preferably less than 10 minutes, preferably less than 5 minutes.

Dividing the total quantity of polymer that is collected during the reaction time by the amount of monomer added to the reaction yields the conversion rate. The monomer-to-polymer conversion rate for the described processes can be as high as 90%. For practical reasons, for example for limiting viscosity, lower conversions could be preferred. Also, for practical reasons, for example for limiting the cost of monomer recycle, maximum conversions could be preferred. Thus, invention processes can be run at practical conversion rates of 80% or less, alternately 60% or less, alternately between 3-80%, alternately between 5-80%, alternately between 10-80%, alternately between 15-80%, alternately between 20-80%, alternately between 25-60%, alternately between 3-60%, alternately between 5-60%, alternately between 10-60%, alternately between 15-60%, alternately between 20-60%, alternately between 10-50%, alternately between 5-40%, alternately between 10-40%, alternately between 20-50%, alternately between 15-40%, alternately between 20-40%, or alternately between 30-40% conversion, preferably greater than 5%, or greater than 10% conversion, preferably greater than 20% conversion.

Comonomers, Dual Catalysts and Polymer Structure

In reactors with multiple injection points for catalyst and feed there exists the possibility to tailor the polymer design. Use of more than one catalyst having different molecular weight and structural capabilities allows a wide variety of product compositions (e.g. bimodal, linear mixed with long chain branched).

When multiple reactors are used, the production of polymer blends is possible. In one embodiment, homopolymer and copolymer blends are made by using at least two reactors in parallel or in series. The homopolymers could be polypropylene, polybutene, polyhexene, polyoctane, etc. In a preferred embodiment, the homopolymer comprises polypropylene, polybutylene, polyhexene, and polystyrene. In a more preferred embodiment, the homopolymer is polypropylene. The copolymers could be any two- or three-component combinations of ethylene, propylene, butene-1, hexene-1, octene-1, styrene, norbornene, 1,5-hexadiene, and 1,7-octadiene. In a more preferred embodiment, the copolymers are made from a two-component combination of ethylene, propylene, butene-1, hexene-1, styrene, norbornene, 1,5-hexadiene, and 1,7-octadiene. In another preferred embodiment, the copolymer is an ethylene-propylene, propylene-butene-1, propylene-hexene-1, propylene-butene-1, ethylene-butene-1, ethylene-hexene-1, ethylene-octene-1 copolymer. When the polymer blends are made in a series reactor cascade, one or more upstream reactors are fed with a single monomer-containing feed, while the feed of one or more downstream reactors is augmented with a comonomer feed stream. Since controlling the ratio of the homo- and copolymer is difficult in a series cascade reactor configuration, parallel reactor configuration are advantageous in the production of polymer blends.

Catalyst Killing

Once the polymerization is complete, the reactor effluent is depressurized to an intermediate pressure significantly below the cloud point pressure. This allows separation of a polymer rich phase for further purification and a propylene rich phase for recycle compression back to the reactor. Sometimes, heating the reactor effluent before pressure let down is necessary to avoid the separation of a solid polymer phase causing fouling.

This separation is typically carried out in a vessel known as a high pressure separator (HPS). Since this vessel also has a significant residence time, the catalyst activity is killed by addition of a polar species such as water, alcohol or sodium/calcium stearate. The choice and quantity of killing agent will depend on the requirements for clean up of the recycle propylene and comonomers as well as the product properties, if the killing agent has low volatility.

Alternately the intermediate separation can be done at pressures well below the critical point so that the monomer concentration and therefore reactivity in the high pressure separator is relatively low. The relatively small amount of continued polymerization in this vessel may not be a problem so addition of catalyst deactivating compounds as is done in PE processes may be avoided presuming that no undesired reactions occur in the high or intermediate pressure recycle system. If no killing compounds are added then the killer removal step can be eliminated.

Choice of Propylene Feed Purity.

Propylene is generally available commercially at two levels of purity—polymer grade at 99.5% and chemical grade at about 93 to 95%. The choice of feed will set the level of purge required from the recycle to avoid over dilution of the feed by inert propane. The presence of propane in the reactor and HPS will raise the pressure of the cloud point curve for a given temperature but will decrease the polymerization efficiency due to a decrease in propylene (and other olefin) concentrations in the reactor. The elevation of cloud point pressure due to propane will widen the operating window of the HPS. In copolymerizations of propylene with limited amounts of ethylene, a similar effect in raising the cloud point pressure will be noted due to the presence of low levels of ethylene in the HPS.

Low Pressure Separator Operation

A low pressure separator (LPS) can be used in the methods described herein. An LPS running at just above atmospheric pressure is just a simple sub-critical flash of light components, reactants and oligomers thereof, for the purpose of producing a low volatile-containing polymer melt entering the finishing extruder or static mixer.

Polymer Products

The polymers produced by invention processes may be in any structures including block, linear, radial, star, branched, and combinations of these. Some invention embodiments produce polypropylene and copolymers of polypropylene with a unique microstructure. The process of the invention can be practiced such that novel isotactic and syndiotactic compositions are made. In other embodiments, the invention processes make crystalline polymers.

The polymers produced herein will typically have a melting point (also called melting temperature) of up to 170° C., preferably from 70° C. to 165° C. The polymers produced herein will typically have a weight-average molecular weight of 2,000 to 1,000,000 g/mol, alternately 10,000 to 1,000,000 g/mol, alternately 15,000 to 600,000 g/mol, alternately 25,000 to 500,000 g/mol, or alternately 35,000 to 350,000 g/mol. Alternately, the polymers produced herein may have an Mw of 30,000 g/mol or more, preferably 50,000 g/mol or more, preferably 100,000 g/mol or more. In a preferred embodiment the polymers produced herein may have a melting point of 80° C. or more, preferably 100° C. or more, preferably 125° C. or more.

Invention processes preferably produce polymer with a heat of fusion, $\Delta H_f$, of 1-60 J/g, 2-50 J/g, or 3-40 J/g. In another embodiment the processes of this invention produce polymers having $\Delta H_f$ of up to 110 J/g, preferably 60 to 100 J/g, more preferably 75 to 90 J/g.

The processes described herein can produce polymers having little or no ash or residue from catalyst or supports. In a preferred embodiment the polymers produced herein comprise less than 1 wt % silica, preferably less than 0.1 wt % silica, preferably less than 100 wt ppm silica, preferably less than 10 wt ppm silica. In a preferred embodiment the polymers produced herein comprise less than 1 wt % metal, preferably less than 0.1 wt % metal.

This invention also relates to:

1. A process to polymerize olefins comprising contacting propylene, at a temperature of 65° C. to 150° C. and a pressure between 1.72 MPa and 34.5 MPa, with:

1) a catalyst system comprising one or more activators and one or more nonmetallocene metal-centered, heteroaryl ligand catalyst compounds, where the metal is chosen from the Group 4, 5, 6, the lanthanide series, or the actinide series of the Periodic Table of the Elements, 2) optionally one or more comonomers selected from the group consisting of ethylene and C4 to C12 olefins (preferably 0 to 20 wt %, based upon the weight of all monomers and comonomers present in the feed), 3) from 20 to 65 wt % diluent or solvent, based upon the total weight of feeds to the polymerization reactor, and 4) optionally scavenger, (preferably 0 to 5 wt % scavenger), based upon the total weight of feeds to the polymerization reactor, wherein:

a) the olefin monomers and any comonomers are present in the polymerization system at 15 wt % or more (preferably at 30 wt % or more), b) the propylene is present at 80 wt % or more based upon the weight of all monomers and comonomers present in the feed, and, c) the polymerization occurs at a temperature above the solid-fluid phase transition temperature of the polymerization system and above a pressure greater than 1 MPa below the cloud point pressure of the polymerization system, and d) the polymerization occurs: (1) at a temperature below the critical temperature of the polymerization system, or (preferably and) (2) at a pressure below the critical pressure of the polymerization system.

2. The process of paragraph 1 wherein solvent comprises C4 to C7 hydrocarbons.

3. The process of paragraph 1 or 2 further comprising obtaining a polymer having an Mw of 30,000 or more, preferably 50,000 or more, preferably 100,000 or more.

4. The process of paragraph 1, 2 or 3 further comprising obtaining a polymer having a melting point of 80° C. or more, preferably 100° C. or more, preferably 125° C. or more.

5. The process of any of paragraphs 1 to 4 wherein the propylene is present in the polymerization system at 20 wt % or more, preferably 25 wt % or more, preferably 30 wt % or more.

6. The process of any of paragraphs 1 to 5 where the temperature is between 70° C. to 140° C., preferably between 80° C. to 130° C.

7. The process of any of paragraphs 1 to 6 wherein the pressure is between 2 and 30 MPa, preferably between 2.5 and 25 MPa.

8. The process of any of paragraphs 1 to 7 wherein solvent and or diluent is hexane.

9. The process of any of paragraphs 1 to 8 wherein the propylene is present in the feed at 75 wt % or more, preferably 80 wt % or more.

10. The process of any of paragraphs 1 to 9 wherein the solvent comprises paraffinic C4 to C7 hydrocarbons.

11. The process of paragraph 1 wherein the temperature is above the cloud point temperature of the polymerization system and the pressure is less than 30 MPa.

12. The process of any of paragraphs 1 to 11 wherein the metal is selected from Hf, Ti and Zr.

13. The process of any of paragraphs 1 to 12 wherein solvent and or diluent is present at 50 to 65 wt %, based upon the weight of the feed.

14. The process of any of paragraphs 1 to 13 wherein comonomer is present in the feed at 0.1 to 20 wt %.

15. The process of any of paragraphs 1 to 14 wherein the feed of the monomer, comonomers, solvents and diluents comprises from 55-100 wt % propylene monomer, and from 0 to 45 wt % of one or more comonomers selected from the group consisting of ethylene, butene, hexene, 4-methylpentene, dicyclopentadiene, norbornene, $C_4$-$C_{2000}$ α-olefins, $C_4$-$C_{2000}$ α,internal-diolefins, and $C_4$-$C_{2000}$ α,ω-diolefins.

16. The process of any of paragraphs 1 to 15 wherein the comonomer comprises one or more of ethylene, butene, hexene-1, octene-1, dodecene-1, or decene-1.

17. The process of any of paragraphs 1 to 16 wherein the nonmetallocene, metal-centered, heteroaryl ligand catalyst compound comprises a ligand represented by the formula (1):

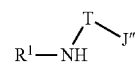

wherein $R^1$ is represented by the formula (2):

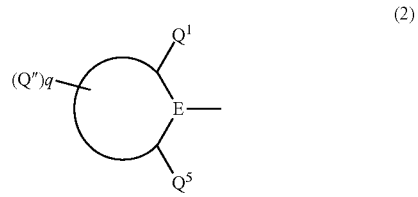

where
$Q^1$ and $Q^5$ are substituents on the ring other than to atom E, where at least one of $Q^1$ or $Q^5$ has at least 2 atoms;
E is selected from the group consisting of carbon and nitrogen;
q is 1, 2, 3, 4 or 5;
Q" is selected from the group consisting of hydrogen, alkyl, substituted alkyl, cycloalkyl, substituted cycloalkyl, heteroalkyl, substituted heteroalkyl, heterocycloalkyl, substituted heterocycloalkyl, aryl, substituted aryl, heteroaryl, substituted heteroaryl, alkoxyl, aryloxyl, silyl, boryl, phosphino, amino, thio, seleno, halide, nitro, and combinations thereof;
T is a bridging group selected group consisting of —$CR^2R^3$— and —$SiR^2R^3$—;
$R^2$ and $R^3$ are each, independently, selected from the group consisting of hydrogen, alkyl, substituted alkyl, cycloalkyl, substituted cycloalkyl, heteroalkyl, substituted heteroalkyl, heterocycloalkyl, substituted heterocycloalkyl, aryl, substituted aryl, heteroaryl, substituted heteroaryl, alkoxyl, aryloxyl, silyl, boryl, phosphino, amino, thio, seleno, halide, nitro, and combinations thereof; and
J" is selected from the group consisting of heteroaryl and substituted heteroaryl.

18. The process of any of paragraphs 1 to 17 wherein the nonmetallocene, metal-centered, heteroaryl ligand catalyst compound comprises a ligand represented by the formula (3):

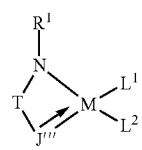

where
M is zirconium or hafnium;
$R^1$, T, $R^2$ and $R^3$ are as defined in paragraph 3,
J''' is selected from the group of substituted heteroaryls with 2 atoms bonded to the metal M, at least one of those atoms being a heteroatom, and with one atom of J''' is bonded to M via a dative bond, the other through a covalent bond; and
$L^1$ and $L^2$ are independently selected from the group consisting of halide, alkyl, substituted alkyl, cycloalkyl, substituted cycloalkyl, heteroalkyl, substituted heteroalkyl, heterocycloalkyl, substituted heterocycloalkyl, aryl, substituted aryl, heteroaryl, substituted heteroaryl, alkoxy, aryloxy, hydroxy, boryl, silyl, amino, amine, hydrido, allyl, diene, seleno, phosphino, phosphine, carboxylates, thio, 1,3-dionates, oxalates, carbonates, nitrates, sulphates, and combinations of these radicals.

19. The process of any of paragraphs 1 to 18 where the nonmetallocene, metal-centered, heteroaryl ligand catalyst is represented by the formula (4):

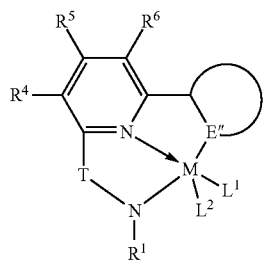

where

M, $L^1$ and $L^2$ are as defined in paragraph 4;

$R^4$, $R^5$, and $R^6$ are independently selected from the group consisting of hydrogen, alkyl, substituted alkyl, cycloalkyl, substituted cycloalkyl, heteroalkyl, substituted heteroalkyl, heterocycloalkyl, substituted heterocycloalkyl, aryl, substituted aryl, heteroaryl, substituted heteroaryl, alkoxyl, aryloxyl, silyl, boryl, phosphino, amino, thio, seleno, nitro, and combinations thereof, optionally, two or more $R^4$, $R^5$, and $R^6$ groups may be joined to form a fused ring system having from 3-50 non-hydrogen atoms in addition to the pyridine ring, or, optionally, any combination of $R^2$, $R^3$, and $R^4$, may be joined together in a ring structure;

$R^1$, T, $R^2$ and $R^3$ are as defined in paragraph 3; and

E″ is either carbon or nitrogen and is part of an cyclic aryl, substituted aryl, heteroaryl, or substituted heteroaryl group.

20. The process of any of paragraphs 1 to 19 wherein the catalyst compound is represented by the one or both of the following formulae:

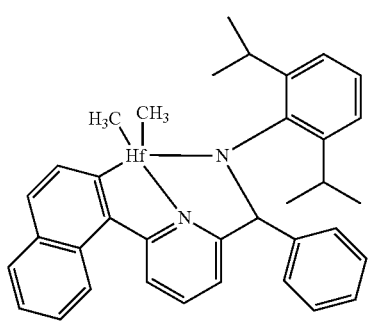

-continued

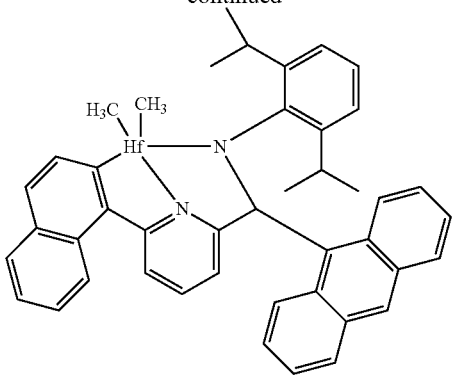

21. The process of any of paragraphs 1 to 20 where the activator comprises an alumoxane, preferably a methylalumoxane.

22. The process of any of paragraphs 1 to 21 where the activator comprises one or more of triethylammonium tetraphenylborate, N,N-dimethylanilinium tetraphenylborate, tripropylammonium tetrakis(pentafluorophenyl) borate, N,N-dimethylanilinium n-butyltris(pentafluorophenyl) borate, triethylammonium tetrakis(2,3,4,6-tetrafluorophenyl) borate, N,N-diethylanilinium tetrakis(2,3,4,6-tetrafluorophenyl) borate, N,N-dimethyl-2,4,6-trimethylanilinium tetrakis(2,3,4,6-tetrafluorophenyl) borate; di-(i-propyl)ammonium tetrakis(pentafluorophenyl) borate, dicyclohexylammonium tetrakis(pentafluorophenyl) borate; triphenylphosphonium tetrakis(pentafluorophenyl) borate, tri(o-tolyl)phosphonium tetrakis(pentafluorophenyl) borate, tri(2,6-dimethylphenyl)phosphonium tetrakis(pentafluorophenyl) borate; diphenyloxonium tetrakis(pentafluorophenyl) borate, di(o-tolyl)oxonium tetrakis(pentafluorophenyl) borate, di(2,6-dimethylphenyl)oxonium tetrakis(pentafluorophenyl) borate; diphenylsulfonium tetrakis(pentafluorophenyl) borate, di(o-tolyl)sulfonium tetrakis(pentafluorophenyl) borate, di(2,6-dimethylphenyl)sulfonium tetrakis(pentafluorophenyl) borate, trimethylsilylium tetrakis(pentafluorophenyl)borate, and triethylsilylium(tetrakispentafluoro)phenylborate.

23. The process of any of paragraphs 1 to 22 where the activator comprises one or more of trimethylammonium tetraphenylborate, triethylammonium tetraphenylborate, tripropylammonium tetraphenylborate, tri(n-butyl)ammonium tetraphenylborate, tri(tert-butyl)ammonium tetraphenylborate, N,N-dimethylanilinium tetraphenylborate, N,N-diethylanilinium tetraphenylborate, N,N-dimethyl-(2,4,6-trimethylanilinium) tetraphenylborate, trimethylammonium tetrakis(pentafluorophenyl)borate, triethylammonium tetrakis(pentafluorophenyl)borate, tripropylammonium tetrakis(pentafluorophenyl)borate, tri(n-butyl)ammonium tetrakis(pentafluorophenyl)borate, tri(sec-butyl)ammonium tetrakis(pentafluorophenyl)borate, N,N-dimethylanilinium tetrakis(pentafluorophenyl)borate, N,N-diethylanilinium tetrakis(pentafluorophenyl)borate, N,N-dimethyl-(2,4,6-trimethylanilinium) tetrakis(pentafluorophenyl)borate, trimethylammonium tetrakis-(2,3,4,6-tetrafluorophenyl) borate, triethylammonium tetrakis-(2,3,4,6-tetrafluorophenyl)borate, tripropylammonium tetrakis-(2,3,4,6-tetrafluorophenyl)borate, tri(n-butyl)ammonium tetrakis-(2,3,4,6-tetrafluorophenyl)borate, dimethyl(tert-butyl)ammonium tetrakis-(2,3,4,6-tetrafluorophenyl)borate, N,N-dimethylanilinium tetrakis-(2,3,4,6-tetrafluorophenyl)borate, N,N-diethylanilinium tetrakis-(2,3,4,6-tetrafluorophenyl)borate, N,N-dimethyl-(2,4,6-trimethylanilinium) tetrakis-(2,3,4,6-tetrafluorophenyl)borate, trimethylammonium tetrakis(perfluoronaphthyl)borate, triethylammonium tetrakis(perfluoronaphthyl)borate, tripropylammonium tetrakis(perfluoronaphthyl)borate, tri(n-butyl)ammonium tetrakis(perfluoronaphthyl)borate, tri(tert-butyl)ammonium tetrakis(perfluoronaphthyl)borate, N,N-dimethylanilinium tetrakis(perfluoronaphthyl)borate, N,N-diethylanilinium tetrakis(perfluoronaphthyl)borate, N,N-dimethyl-(2,4,6-trimethylanilinium) tetrakis(perfluoronaphthyl)borate, trimethylammonium tetrakis(perfluorobiphenyl)borate, triethylammonium tetrakis(perfluorobiphenyl)borate, tripropylammonium tetrakis(perfluorobiphenyl)borate, tri(n-butyl)ammonium tetrakis(perfluorobiphenyl)borate, tri(tert-butyl)ammonium tetrakis(perfluorobiphenyl)borate, N,N-dimethylanilinium tetrakis(perfluorobiphenyl)borate, N,N-diethylanilinium tetrakis(perfluorobiphenyl)borate, N,N-dimethyl-(2,4,6-trimethylanilinium) tetrakis(perfluorobiphenyl)borate, trimethylammonium tetrakis(3,5-bis(trifluoromethyl)phenyl)borate, triethylammonium tetrakis(3,5-bis(trifluoromethyl)phenyl)borate, tripropylammonium tetrakis(3,5-bis(trifluoromethyl)phenyl)borate, tri(n-butyl)ammonium tetrakis(3,5-bis(trifluoromethyl)phenyl)borate, tri(tert-butyl)ammonium tetrakis(3,5-bis(trifluoromethyl)phenyl)borate, N,N-dimethylanilinium tetrakis(3,5-bis(trifluoromethyl)phenyl)borate, N,N-diethylanilinium tetrakis(3,5-bis(trifluoromethyl)phenyl)borate, N,N-dimethyl-(2,4,6-trimethylanilinium) tetrakis(3,5-bis(trifluoromethyl)phenyl)borate, di-(iso-propyl)ammonium tetrakis(pentafluorophenyl)borate, and dicyclohexylammonium tetrakis(pentafluorophenyl)borate; tri(o-tolyl)phosphonium tetrakis(pentafluorophenyl)borate, tri(2,6-dimethylphenyl)phosphonium tetrakis(pentafluorophenyl)borate, tropillium tetraphenylborate, triphenylcarbenium tetraphenylborate, triphenylphosphonium tetraphenylborate, triethylsilylium tetraphenylborate, benzene(diazonium)tetraphenylborate, tropillium tetrakis(pentafluorophenyl)borate, triphenylcarbenium tetrakis(pentafluorophenyl)borate, triphenylphosphonium tetrakis(pentafluorophenyl)borate, triethylsilylium tetrakis(pentafluorophenyl)borate, benzene(diazonium) tetrakis(pentafluorophenyl)borate, tropillium tetrakis-(2,3,4,6-tetrafluorophenyl)borate, triphenylcarbenium tetrakis-(2,3,4,6-tetrafluorophenyl)borate, triphenylphosphonium tetrakis-(2,3,4,6-tetrafluorophenyl)borate, triethylsilylium tetrakis-(2,3,4,6-tetrafluorophenyl)borate, benzene(diazonium) tetrakis-(2,3,4,6-tetrafluorophenyl)borate, tropillium tetrakis(perfluoronaphthyl)borate, triphenylcarbenium tetrakis(perfluoronaphthyl)borate, triphenylphosphonium tetrakis(perfluoronaphthyl)borate, triethylsilylium tetrakis(perfluoronaphthyl)borate, benzene(diazonium) tetrakis(perfluoronaphthyl)borate, tropillium tetrakis(perfluorobiphenyl)borate, triphenylcarbenium tetrakis(perfluorobiphenyl)borate, triphenylphosphonium tetrakis(perfluorobiphenyl)borate, triethylsilylium tetrakis(perfluorobiphenyl)borate, benzene(diazonium) tetrakis(perfluorobiphenyl)borate, tropillium tetrakis(3,5-bis(trifluoromethyl)phenyl)borate, triphenylcarbenium tetrakis(3,5-bis(trifluoromethyl)phenyl)borate, triphenylphosphonium tetrakis(3,5-bis(trifluoromethyl)phenyl)borate, triethylsilylium tetrakis(3,5-bis(trifluoromethyl)phenyl)borate, or benzene(diazonium) tetrakis(3,5-bis(trifluoromethyl)phenyl)borate.

24. The process of any of paragraphs 1 to 20 wherein the activator comprises N,N-dimethylanilinium tetra(perfluorophenyl)borate and/or triphenylcarbenium tetra(perfluorophenyl)borate.

25. The process of any of paragraphs 1 to 24 where diluent or solvent is present and the diluent or solvent comprises a fluorinated hydrocarbon.

26. The process of any of paragraphs 1 to 25 wherein the polymerization takes place in a tubular reactor.

27. The process of paragraph 26 wherein the tubular reactor has a length-to-internal diameter ratio of 10:1 to 50,000:1.

28. The process of paragraph 26 or 27 wherein the reactor contains from one to ten different injection positions, alternately from one to six different injection positions.

29. The process of paragraph 26, 27 or 28 wherein the tubular reactor has a length of 100-4000 meters, preferably 100-2000 meters and/or an internal diameter of less than 12.5 cm, preferably less than 10 cm.

30. The process of paragraph 26, 27, 28 or 29 wherein the tubular reactor is operated in multiple zones.

31. The process of any of paragraphs 1 to 25 wherein the polymerization takes place in an autoclave reactor.

32. The process of paragraph 31 wherein the autoclave reactor has a length-to-diameter ratios of 1:1 to 20:1, preferably 4:1 to 20:1.

33. The process of paragraph 31 wherein the autoclave reactor has a length-to-diameter ratio of 4:1 to 20:1 and the reactor contains up to six different injection positions.

34. The process of paragraph 31, 32 or 33 wherein the autoclave reactor is operated in multiple zones.

35. The process of paragraph 31, 32, 33 or 34 wherein the process comprises (a) continuously feeding olefin monomers, catalyst compound, and activator to the autoclave reactor; (b) continuously polymerizing the monomers at a pressure of 1.5 MPa or more; (c) continuously removing the polymer/monomer mixture from the reactor; (d) reducing pressure to form a monomer-rich phase and a polymer-rich phase; (e) continuously separating monomer from the polymer; and (f) optionally recycling separated monomer to the polymerization process.

36. The process of any of paragraphs 1 to 25 wherein the polymerization takes place in a loop reactor.

37. The process of paragraph 36 wherein the loop reactor has a diameter of 41 to 61 cm and a length of 100 to 200 meters.

38. The process of paragraph 36 or 37 wherein the loop reactor is operated at pressures of 1.5 to 30 MPa.

39. The process of paragraph 36, 37 or 38 where an in-line pump continuously circulates the polymerization system through the loop reactor.

40. The process of paragraph 36, 37, 38 or 39 wherein the process comprises (a) continuously feeding olefin monomers, catalyst compound, and activator to the loop reactor; (b) continuously polymerizing the monomers at pressure of 1.5 MPa or more; (c) continuously removing the polymer/monomer mixture from the reactor; (d) reducing pressure to form a monomer-rich phase and a polymer-rich phase; (e) continuously separating monomer from the polymer; and (f) optionally recycling separated monomer to the polymerization process.

41. The process of any of paragraphs 1 to 39 wherein the polymerization takes place in multiple reactors.

42. The process of any of paragraphs 1 to 41 wherein the polymerization process comprises two or more reactors configured in parallel.

43. The process of paragraph 42 one or more of the reactors configured in parallel comprises a stirred autoclave reactor.

44. The process of paragraph 42 or 43 wherein one or more of the reactors configured in parallel comprises a loop reactor.

45. The process paragraph 42, 43 or 44 wherein one or more of the reactors configured in parallel comprises a tubular reactor.

46. The process of any of paragraphs 1 to 45 wherein the polymerization process comprises two or more reactors configured in series.

47. The process of paragraph 41, 42, or 46 wherein the polymerization takes places in a tubular reactor and then in one or more autoclave reactors.

48. The process of paragraph 41, 42, or 46 wherein the polymerization takes places in a tubular reactor and then one or more loop reactors.

49. The process of any of paragraphs 1 to 48 wherein the residence time in any one reactor (alternately in all reactors total) is less than 30 minutes, preferably less than 20 minutes, preferably less than 10 minutes, preferably less than 5 minutes.

50. The process of any of paragraphs 1 to 49 wherein the propylene is present in the polymerization system at 30 to 40 wt %.

51. The process of any of paragraphs 1 to 50 where the solvent or diluent are present at 60 to 70 wt % in the polymerization system.

52. The process of any of paragraphs 1 to 51 where the catalyst system is dissolved in the polymerization system.

53. The process of any of paragraphs 1 to 52 wherein the catalyst system further comprises one or more metallocene catalyst compounds.

54. The process of any of paragraphs 1 to 53 wherein the product of the polymerization process has a weight average molecular weight (Mw) of up to 2,000,000 g/mol as measured by Gel Permeation Chromatography.

55. The process of any of paragraphs 1 to 54 wherein the product of the polymerization process has a melting peak temperature of up to 170° C. as measured by Differential Scanning calorimetry.

56. The process of any of paragraphs 1 to 55 wherein the metal is selected from Group 5 of the Periodic Table of the Elements.

57. The process of any of paragraphs 1 to 55 wherein the metal is selected from Group 6 of the Periodic Table of the Elements.

58. The process of any of paragraphs 1 to 55 wherein the nonmetallocene, metal-centered, heteroaryl ligand catalyst compound comprises any metal from the Actinide or Lanthanide series of the Periodic Table of the Elements.

59. The process of any of paragraphs 1 to 58 wherein the propylene is present in the reactor effluent at 2.5 to 10 molar, alternately at 3 to 10 molar, alternately 3.5 to 8 molar, alternately 3.5 to 6 molar, alternately 4 to 5 molar.

60. The process of any of paragraphs 1 to 59 wherein the feed composition is about 35 wt % propylene, about 65 wt % isohexane, and, optionally the reaction temperature is about 101° C.

EXAMPLES

All manipulations were conducted in a drybox with less than 10 ppm of oxygen and water. All solvents were degassed with nitrogen and dried over Na/K alloy prior to use. Catalyst Compound A (depicted below) was prepared according to the procedure generally described in WO 03/040201 A1, Page 90 line, 21 to page 93, line 9.

Catalyst Precursor Compound A

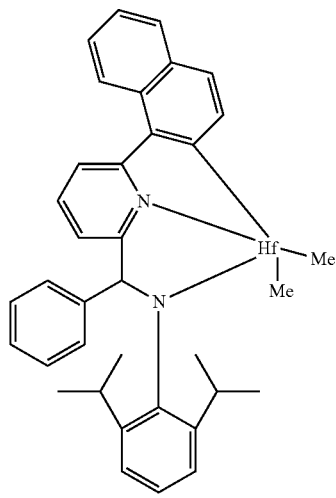

Examples 1-3

A 37 cc stainless steel autoclave reactor equipped with a magnetic stir bar was heated to 120° C. for one hour under a stream of dry nitrogen in order to dry the reactor. The reactor was cooled and subsequently charged with hexane (15.8 mL, 11.49 g, 133.3 mmol) and tri-n-octyl aluminum (0.080 mmol; added in a 4.2 mL solution of hexane) as a scavenger. Thus, the total amount of hexane in the reactor is 20 mL. The total amount of tri-n-octyl aluminum utilized was adjusted to achieve a targeted Al:M (where M=Zr or Hf) molar ratio not greater than 300:1 (ideally we target ~200:1), respectively. The reactor was purged with propylene gas (purity >99%, Airgas Corporation) and then sealed to maintain an atmosphere of propylene. The reactor was then heated to 105° C., at which time more liquid propylene was added (16.0 mL; 8.176 g) via syringe pump to bring the pressure up to ~600 psi (4.1 MPa) and the contents were stirred. In a nitrogen-purged drybox, separate stock solutions of Catalyst Precursor Compound A in toluene (0.001 g/ml) and [N,N-dimethylanilinium][tetrakis(heptafluoronapthyl)borate] in toluene (0.001 g/mL) were prepared. The activated catalyst solution was prepared, utilizing these stock solutions, by adding Catalyst Precursor Compound A (2.713 mL, 2.713 mg, 0.004 mmol) and [N,N-dimethylanilinium][tetrakis(heptafluoronapthyl)borate] (5.496 mL, 5.496 mg. 0.0048 mmol) to a flask containing freshly dried toluene (1.791 mL). This mixture was stirred at room temperature for approximately 15 minutes. Next, in the dry box, 5.5 mL of this solution was charged to a previously dried syringe pump, sealed and attached to the 37 cc reactor. The activated catalyst toluene solution (~1 mL; 0.0004 mmol) was introduced by overpressurizing the feed line via syringe pump (~1000 psi; 6.9 MPa) above the reactor pressure (~600 psi; 4.1 MPa). After catalyst addition, propylene was added to maintain a minimum pressure of 1000 psi (6.9 MPa). The reactor was maintained at temperature and pressure for 30 minutes. Additional propylene is added to maintain the reactor pressure at 1000 psi (6.9 MPa). The reaction was terminated by venting the contents into a vent collection vessel attached to the reactor vent line. After cooling, product is recovered from the vent collector and the reactor. The product was dried in a vacuum oven for 12 hours and product characterized by gel permeation chromatography (GPC) and differential scanning calorimetry (DSC).

TABLE 1

| Example | 1 | 2 | 3 | 4 | 5 | 6 |
|---|---|---|---|---|---|---|
| Cat. A (μmol) | 0.4 | 0.4 | 0.3 | 0.4 | 0.4 | 0.4 |
| Reaction Temp. (° C.) | 105 | 105 | 105 | 105 | 105 | 105 |
| Activator B (mmol) | 0.48 | 0.48 | 0.36 | 0.48 | 0.48 | 0.48 |
| TNOAl (mmol) | 0.080 | 0.080 | 0.061 | 0.019 | 0.019 | 0.019 |
| Al:Hf molar ratio | 201 | 201 | 204 | 48 | 48 | 48 |
| Reactor Pressure (MPa) | ~6.9 | ~6.9 | ~6.9 | ~6.9 | ~6.9 | ~6.9 |
| Propylene concentration (M) | 3.55 | 3.55 | 3.55 | 3.55 | 3.55 | 3.55 |
| Rxn Time (Min) | 30 | 30 | 30 | 30 | 30 | 30 |
| Yield (g) | 0.853 | 2.887 | 0.470 | 0.612 | 1.410 | 1.136 |
| Mw (g/mol) | 21,000 | 37,000 | 31,000 | 175,000 | 188,000 | 190,000 |
| Mw/Mn | 1.95 | 2.30 | 1.99 | 2.77 | 2.82 | 2.79 |
| Tm (° C.) | 135.9 | 137.6 | 138.1 | 138.5 | 138.7 | 138.7 |
| Hf (J/g) | 89.3 | 87.2 | 89.5 | 78.7 | 80.7 | 78.7 |

Activator B = [N,N-dimethylanilinium] [tetrakis(heptafluoronapthyl)borate]
TNOAl = tri-n-octyl aluminum, Cat. A = Catalyst Precursor Compound A.

Analytical Methods
Differential Scanning Calorimetry (DSC):

Phase transitions were measured on heating and cooling the sample from the solid state and melt respectively using Differential Scanning calorimetry (DSC). For crystallization temperature (Tc) and melting temperature ($T_m$), the measurements were conducted using a TA Instrument MDSC 2920 or Q1000 Tzero-DSC and data analyzed using the standard analysis software by the vendor. 3 to 10 mg of polymer was encapsulated in an aluminum pan and loaded into the instrument at room temperature. The sample was cooled to −70° C. and heated to 210° C. at a heating rate of 10° C./min. Each sample was held at 210° C. for 5 minutes to establish a common thermal history. Crystallization behavior was evaluated by cooling the sample from the melt to sub-ambient temperature at a cooling rate of 10° C./min. The sample was held at the low temperature for 10 minutes to fully equilibrate in the solid state and achieve a steady state. Second heating data was measured by heating this in-situ melt-crystallized sample at 10° C./min. The second heating data thus provide phase behavior for samples crystallized under controlled thermal history conditions. The melting temperatures reported in Table 1 are the peak melting temperatures from the second melt unless otherwise indicated. For polymers displaying multiple peaks, the higher melting peak temperature was reported.

Areas under the curve are used to determine the heat of fusion ($H_f$) which can be used to calculate the degree of crystallinity (also referred to as percent crystallinity). For determining polypropylene crystallinity, a value of 8.7 kJ/mol is used as the equilibrium heat of fusion for 100% crystalline polypropylene (single crystal measurement) reported in B. Wunderlich, "Thermal Analysis", Academic Press, Page 418, 1990). The percent crystallinity for the propylene polymers is calculated using the formula, [area under the curve (J/g)×42 g/mol/8700 (J/mol)]*100%. For other polymers the percent crystallinity is calculated using the formula, [area under the curve (Joules/gram)/B (Joules/gram)]*100, where B is the heat of fusion for the homopolymer of the major monomer component. These values for B are to be obtained from the Polymer Handbook, Fourth Edition, published by John Wiley and Sons, New York 1999.

Gel Permeation Chromatography (GPC-DRI)

The analysis was performed using a Waters GPCV 2000 (Gel Permeation Chromatograph) with triple detection. The three detectors were in series with Wyatt DAWN "EOS" MALLS 18 angle laser light scattering detector first, followed by the DRI (Differential Refractive Index) then Differential Viscometer detector. The detector output signals are collected on Wyatt's ASTRA software and analyzed using a GPC analysis program. The detailed GPC conditions are listed in Table 2.

Standards and samples were prepared in inhibited TCB (1,2,4-trichlorobenzene) solvent. Four NBS polyethylene standards were used for calibrating the GPC. Standard identifications are listed in Table 2. The samples were accurately weighed and diluted to a ~1.5 mg/mL concentration and recorded. The standards and samples were placed on a PL Labs 260 Heater/Shaker at 160° C. for two hours. These were filtered through a 0.45 micron steel filter cup then analyzed.

TABLE 2

| Gel Permeation Chromatography (GPC) measurement conditions | | | |
|---|---|---|---|
| INSTRUMENT | | | WATERS 2000V + Wyatt Dawn EOS |
| COLUMN | | Type: | 3 × MIXED BED TYPE "B" |
| | | | 10 MICRON PD (high porosity col.'s) |
| | | Length: | 300 mm |
| | | ID: | 7.8 mm |
| | | Supplier | POLYMER LABS |
| SOLVENT PROGRAM | | A | 0.54 ml/min TCB inhibited |
| | | | GPC console setting was 0.5 mL/min to which 8% expansion factor (from Waters) makes actual flow 0.54 mL/min |
| DETECTOR | | A: | Wyatt MALLS 17 angle's of laser light scattering detector |
| | | B: | DIFFERENTIAL REFRACTIVE INDEX (DRI) in series |
| | | C: | Viscometer |
| | | | IDvol. =+ 232.2 ul LS to DRI |
| | | | IDvol. =− 91.8 ul Dp to DRI |

TABLE 2-continued

Gel Permeation Chromatography (GPC) measurement conditions

| | | |
|---|---|---|
| TEMPERATURE | Injector: | 135° C. |
| | Detector: | 135° C. |
| | Column: | 135° C. |
| DISOLUTION CONDITIONS | | Shaken for 2 h on a PL SP260 heater Shaker @ 160° C. |
| SAMPLE FILTRATION | | Through a 0.45 µ SS Filter @ 135° C. |
| INJECTION VOLUME | | 329.5 µL |
| SAMPLE CONCENTRATION | | 0.15 w/v % (1.5 mg/ml) Target wt |
| SOLVENT DILUENT | | TCB inhibited |
| CALIBRATION NARROW PE STANDARDS | | NIST 1482a; NIST1483a; NIST1484a |
| BROAD PE STANDARD | | NIST 1475a |

All documents described herein are incorporated by reference herein, including any priority documents and/or testing procedures, except to the extent they are inconsistent with this specification. As is apparent from the foregoing general description and the specific embodiments, while forms of the invention have been illustrated and described, various modifications can be made without departing from the spirit and scope of the invention. Accordingly, it is not intended that the invention be limited thereby. Likewise, the term "comprising" is considered synonymous with the term "including" for purposes of Australian law.

The invention claimed is:

1. A process to polymerize olefins comprising contacting propylene, at a temperature of 65° C. to 150° C. and a pressure between 1.72 MPa and 34.5 MPa, with:
   1) a catalyst system comprising one or more activators and one or more nonmetallocene metal-centered, heteroaryl ligand catalyst compounds, where the metal is chosen from the Group 4, 5, 6, the lanthanide series, or the actinide series of the Periodic Table of the Elements,
   2) 0 to 20 wt % of one or more comonomers (based upon the weight of all monomers and comonomers present in the feed) selected from the group consisting of ethylene and C4 to C12 olefins,
   3) from 20 to 65 wt % diluent or solvent, based upon the total weight of the feeds to the polymerization reactor, and
   4) 0 to 5 wt % scavenger, based upon the total weight of the feeds to the polymerization reactor,
   wherein:
   a) the olefin monomers and any comonomers are present in the polymerization system at 15 wt % or more,
   b) the propylene is present at 80 wt % or more based upon the weight of all monomers and comonomers present in the feed, and
   c) the polymerization occurs at a temperature above the solid-fluid phase transition temperature of the polymerization system and a pressure greater than 1 MPa below the cloud point pressure of the polymerization system, and
   d) the polymerization occurs: (1) at a temperature below the critical temperature of the polymerization system, or (2) at a pressure below the critical pressure of the polymerization system.

2. The process of claim 1 wherein the propylene is present in the polymerization system at 20 to 40 wt %.

3. The process of claim 1 where the temperature is between 80° C. to 150° C.

4. The process of claim 1 wherein the pressure is between 2 and 30 MPa.

5. The process of claim 1 wherein solvent and or diluent is present in the feed at 25 to 65 wt %.

6. The process of claim 1 wherein solvent or diluent comprises C4 to C7 hydrocarbons.

7. The process of claim 1 wherein the metal is selected from Hf, Ti and Zr.

8. The process of claim 1 wherein the comonomer comprises one or more of ethylene, butene, hexene-1, octene-1, dodecene-1, or decene-1.

9. The process of claim 1 wherein the nonmetallocene, metal-centered, heteroaryl ligand catalyst compound comprises a ligand represented by the formula (1):

$$R^1-NH\overset{T}{\diagdown}J''\quad(1)$$

wherein $R^1$ is represented by the formula (2):

$$(Q'')q-\underset{Q^5}{\overset{Q^1}{\bigcirc}}-E-\quad(2)$$

where
$Q^1$ and $Q^5$ are substituents on the ring other than to atom E, where at least one of $Q^1$ or $Q^5$ has at least 2 atoms;
E is selected from the group consisting of carbon and nitrogen;
q is 1, 2, 3, 4 or 5;
Q" is selected from the group consisting of hydrogen, alkyl, substituted alkyl, cycloalkyl, substituted cycloalkyl, heteroalkyl, substituted heteroalkyl, heterocycloalkyl, substituted heterocycloalkyl, aryl, substituted aryl, heteroaryl, substituted heteroaryl, alkoxyl, aryloxyl, silyl, boryl, phosphino, amino, thio, seleno, halide, nitro, and combinations thereof;
T is a bridging group selected from the group consisting of —$CR^2R^3$— and —$SiR^2R^3$—;
$R^2$ and $R^3$ are each, independently, selected from the group consisting of hydrogen, alkyl, substituted alkyl, cycloalkyl, substituted cycloalkyl, heteroalkyl, substituted heteroalkyl, heterocycloalkyl, substituted heterocycloalkyl, aryl, substituted aryl, heteroaryl, substituted heteroaryl, alkoxyl, aryloxyl, silyl, boryl, phosphino, amino, thio, seleno, halide, nitro, and combinations thereof; and J" is selected from the group consisting of heteroaryl and substituted heteroaryl.

10. The process of claim 1 wherein the nonmetallocene, metal-centered, heteroaryl ligand catalyst compound is represented by the formula (3):

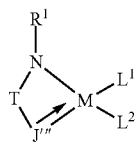

where

M is zirconium or hafnium;

J'" is selected from the group of substituted heteroaryls with 2 atoms bonded to the metal M, at least one of those atoms being a heteroatom, and with one atom of J' is bonded to M via a dative bond, the other through a covalent bond;

$L^1$ and $L^2$ are independently selected from the group consisting of halide, alkyl, substituted alkyl, cycloalkyl, substituted cycloalkyl, heteroalkyl, substituted heteroalkyl, heterocycloalkyl, substituted heterocycloalkyl, aryl, substituted aryl, heteroaryl, substituted heteroaryl, alkoxy, aryloxy, hydroxy, boryl, silyl, amino, amine, hydrido, allyl, diene, seleno, phosphino, phosphine, carboxylates, thio, 1,3-dionates, oxalates, carbonates, nitrates, sulphates, and combinations of these radicals;

$R^1$ is a ring having from 4-8 atoms in the ring selected from the group consisting of substituted cycloalkyl, substituted heterocycloalkyl, substituted aryl and substituted heteroaryl, such that $R^1$ is characterized by the general formula:

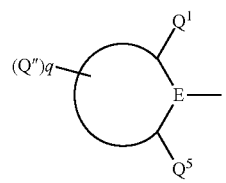

where $Q^1$ and $Q^5$ are substituents on the ring other than to atom E, with E being selected from the group consisting of carbon and nitrogen and with at least one of $Q^1$ or $Q^5$ having at least 2 atoms, $Q''_q$ represents additional possible substituents on the ring, with q being 1, 2, 3, 4 or 5 and Q" being selected from the group consisting of hydrogen, alkyl, substituted alkyl, cycloalkyl, substituted cycloalkyl, heteroalkyl, substituted heteroalkyl, heterocycloalkyl, substituted heterocycloalkyl, aryl, substituted aryl, heteroaryl, substituted heteroaryl, alkoxyl, aryloxyl, silyl, boryl, phosphino, amino, thio, seleno, halide, nitro, and combinations thereof; and T is a bridging group selected from the group consisting of —$CR^2R^3$— and —$SiR^2R^3$— with $R^2$ and $R^3$ being independently selected from the group consisting of hydrogen, alkyl, substituted alkyl, cycloalkyl, substituted cycloalkyl, heteroalkyl, substituted heteroalkyl, heterocycloalkyl, substituted heterocycloalkyl, aryl, substituted aryl, heteroaryl, substituted heteroaryl, alkoxyl, aryloxyl, silyl, boryl, phosphino, amino, thio, seleno, halide, nitro, and combinations thereof.

11. The process of claim 1 where the nonmetallocene, metal-centered, heteroaryl ligand catalyst is represented by the formula (4):

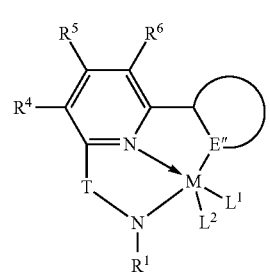

where

M is zirconium or hafnium;

$R^4$, $R^5$, and $R^6$ are independently selected from the group consisting of hydrogen, alkyl, substituted alkyl, cycloalkyl, substituted cycloalkyl, heteroalkyl, substituted heteroalkyl, heterocycloalkyl, substituted heterocycloalkyl, aryl, substituted aryl, heteroaryl, substituted heteroaryl, alkoxyl, aryloxyl, silyl, boryl, phosphino, amino, thio, seleno, nitro, and combinations thereof, optionally, two or more $R^4$, $R^5$, and $R^6$ groups may be joined to form a fused ring system having from 3-50 non-hydrogen atoms in addition to the pyridine ring, or, optionally, any combination of $R^2$, $R^3$, and $R^4$, may be joined together in a ring structure;

E" is either carbon or nitrogen and is part of an cyclic aryl, substituted aryl, heteroaryl, or substituted heteroaryl group;

$L^1$ and $L^2$ are independently selected from the group consisting of halide, alkyl, substituted alkyl, cycloalkyl, substituted cycloalkyl, heteroalkyl, substituted heteroalkyl, heterocycloalkyl, substituted heterocycloalkyl, aryl, substituted aryl, heteroaryl, substituted heteroaryl, alkoxy, aryloxy, hydroxy, boryl, silyl, amino, amine, hydrido, allyl, diene, seleno, phosphino, phosphine, carboxylates, thio, 1,3-dionates, oxalates, carbonates, nitrates, sulphates, and combinations of these radicals;

$R^1$ is a ring having from 4-8 atoms in the ring selected from the group consisting of substituted cycloalkyl, substituted heterocycloalkyl, substituted aryl and substituted heteroaryl, such that $R^1$ is characterized by the general formula:

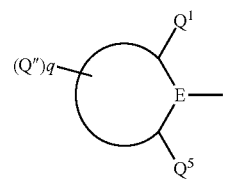

where $Q^1$ and $Q^5$ are substituents on the ring other than to atom E, with E being selected from the group consisting of carbon and nitrogen and with at least one of $Q^1$ or $Q^5$ having at least 2 atoms, $Q''_q$ represents additional possible substituents on the ring, with q being 1, 2, 3, 4 or 5 and Q" being selected from the group consisting of hydrogen, alkyl, substituted alkyl, cycloalkyl, substituted cycloalkyl, heteroalkyl, substituted heteroalkyl, heterocycloalkyl, substituted heterocycloalkyl, aryl, substituted aryl, heteroaryl, substituted heteroaryl, alkoxyl, aryloxyl, silyl, boryl, phosphino, amino, thio, seleno, halide, nitro, and combinations thereof; and T is a bridging group selected from the group consisting of —$CR^2R^3$— and —$SiR^2R^3$— with $R^2$ and $R^3$ being independently selected from the group consisting of hydrogen, alkyl, substituted alkyl, cycloalkyl, substituted cycloalkyl, heteroalkyl, substituted heteroalkyl, heterocycloalkyl, substituted heterocycloalkyl, aryl, substituted aryl, heteroaryl, substituted heteroaryl, alkoxyl, aryloxyl, silyl, boryl, phosphino, amino, thio, seleno, halide, nitro, and combinations thereof.

12. The process of claim 1 wherein the catalyst compound is represented by the one or both of the following formulae:

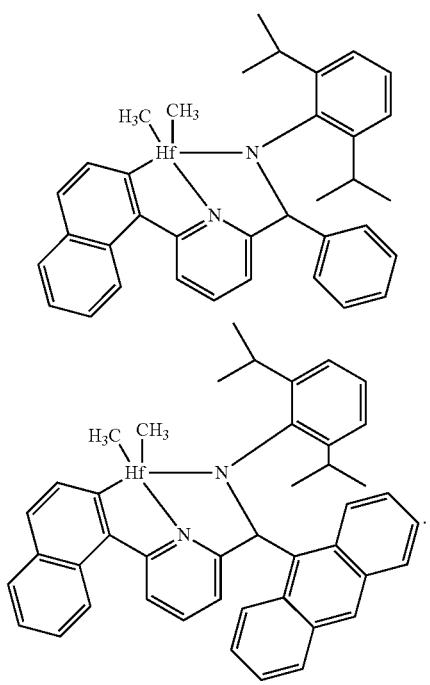

13. The process of claim 1 where the activator comprises an alumoxane.

14. The process of claim 1 where the activator comprises a non-coordinating anion.

15. The process of claim 1 where diluent or solvent is present and the diluent or solvent comprises a fluorinated hydrocarbon.

16. The process of claim 1 wherein the polymerization takes place in a tubular reactor.

17. The process of claim 1 wherein the polymerization takes place in an autoclave reactor.

18. The process of claim 1 wherein the polymerization takes place in a loop reactor.

19. The process of claim 1 wherein the process further comprises (a) continuously feeding olefin monomers, catalyst compound, and activator to the autoclave reactor; (b) continuously polymerizing the monomers at a pressure between 2 and 30 MPa; (c) continuously removing the polymer/monomer mixture from the reactor; (d) reducing pressure to form a monomer-rich phase and a polymer-rich phase; (e) continuously separating monomer from the polymer; and (f) optionally recycling separated monomer to the polymerization process.

20. The process of claim 1 wherein the residence time is less than 30 minutes in any one reactor.

21. The process of claim 1 where the catalyst system is dissolved in the polymerization system.

22. A process to polymerize olefins comprising contacting propylene, at a temperature of 65° C. to 150° C. and a pressure between 1.72 MPa and 34.5 MPa, with:
1) a catalyst system comprising one or more activators and one or more nonmetallocene metal-centered, heteroaryl ligand catalyst compounds, where the metal is chosen from the Group 4, 5, 6, the lanthanide series, or the actinide series of the Periodic Table of the Elements,
2) 0 to 20 wt % of one or more comonomers (based upon the weight of all monomers and comonomers present in the feed) selected from the group consisting of ethylene and C4 to C12 olefins,
3) from 20 to 65 wt % diluent or solvent, based upon the total weight of the feeds to the polymerization reactor, and
4) 0 to 5 wt % scavenger, based upon the total weight of the feeds to the polymerization reactor,
wherein:
a) the olefin monomers and any comonomers are present in the polymerization system at 15 wt % or more,
b) the propylene is present at 80 wt % or more based upon the weight of all monomers and comonomers present in the feed, and
c) the polymerization occurs at a temperature above the solid-fluid phase transition temperature of the polymerization system and a pressure greater than 1 MPa below the cloud point pressure of the polymerization system, and
d) the polymerization occurs: (1) at a temperature below the critical temperature of the polymerization system, or (2) at a pressure below the critical pressure of the polymerization system,
wherein the catalyst system further comprises one or more metallocene catalyst compounds.

23. A process to polymerize olefins comprising contacting propylene, at a temperature of 65° C. to 150° C. and a pressure between 1.72 MPa and 34.5 MPa, with:
1) a catalyst system comprising one or more activators and one or more nonmetallocene metal-centered, heteroaryl ligand catalyst compounds, wherein the metal is selected from Group 5 of the Periodic Table of the Elements,
2) 0 to 20 wt % of one or more comonomers (based upon the weight of all monomers and comonomers present in the feed) selected from the group consisting of ethylene and C4 to C12 olefins,
3) from 20 to 65 wt % diluent or solvent, based upon the total weight of the feeds to the polymerization reactor, and
4) 0 to 5 wt % scavenger, based upon the total weight of the feeds to the polymerization reactor,
wherein:
a) the olefin monomers and any comonomers are present in the polymerization system at 15 wt % or more,
b) the propylene is present at 80 wt % or more based upon the weight of all monomers and comonomers present in the feed, and
c) the polymerization occurs at a temperature above the solid-fluid phase transition temperature of the polymerization system and a pressure greater than 1 MPa below the cloud point pressure of the polymerization system, and
d) the polymerization occurs: (1) at a temperature below the critical temperature of the polymerization system, or (2) at a pressure below the critical pressure of the polymerization system.

24. A process to polymerize olefins comprising contacting propylene, at a temperature of 65° C. to 150° C. and a pressure between 1.72 MPa and 34.5 MPa, with:
1) a catalyst system comprising one or more activators and one or more nonmetallocene metal-centered, heteroaryl ligand catalyst compounds, wherein the metal is selected from Group 6 of the Periodic Table of the Elements,
2) 0 to 20 wt % of one or more comonomers (based upon the weight of all monomers and comonomers present in the feed) selected from the group consisting of ethylene and C4 to C12 olefins,
3) from 20 to 65 wt % diluent or solvent, based upon the total weight of the feeds to the polymerization reactor, and
4) 0 to 5 wt % scavenger, based upon the total weight of the feeds to the polymerization reactor,
wherein:
a) the olefin monomers and any comonomers are present in the polymerization system at 15 wt % or more,
b) the propylene is present at 80 wt % or more based upon the weight of all monomers and comonomers present in the feed, and
c) the polymerization occurs at a temperature above the solid-fluid phase transition temperature of the polymerization system and a pressure greater than 1 MPa below the cloud point pressure of the polymerization system, and
d) the polymerization occurs: (1) at a temperature below the critical temperature of the polymerization system, or (2) at a pressure below the critical pressure of the polymerization system.

25. The process of claim 1 wherein the propylene is present in the reactor effluent at 2.5 to 10 molar.

* * * * *

UNITED STATES PATENT AND TRADEMARK OFFICE
CERTIFICATE OF CORRECTION

| | | |
|---|---|---|
| PATENT NO. | : 8,008,412 B2 | Page 1 of 1 |
| APPLICATION NO. | : 11/954273 | |
| DATED | : August 30, 2011 | |
| INVENTOR(S) | : Patrick Brant et al. | |

It is certified that error appears in the above-identified patent and that said Letters Patent is hereby corrected as shown below:

Delete the inventor's name shown on the cover page, item (75) as "Kiss Gabor" and replace it with "Gabor Kiss".

Signed and Sealed this
Thirty-first Day of July, 2012

David J. Kappos
*Director of the United States Patent and Trademark Office*